United States Patent
Besehanic

(10) Patent No.: US 9,357,261 B2
(45) Date of Patent: *May 31, 2016

(54) METHODS AND APPARATUS TO MEASURE EXPOSURE TO STREAMING MEDIA

(71) Applicant: The Nielsen Company (US), LLC, New York, NY (US)

(72) Inventor: Jan Besehanic, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 202 days.

This patent is subject to a terminal disclaimer.

(21) Appl. No.: 13/793,959

(22) Filed: Mar. 11, 2013

(65) Prior Publication Data

US 2014/0229629 A1    Aug. 14, 2014

Related U.S. Application Data

(63) Continuation of application No. 13/767,548, filed on Feb. 14, 2013.

(51) Int. Cl.
| | |
|---|---|
| *H04H 60/32* | (2008.01) |
| *H04N 21/442* | (2011.01) |
| *H04H 60/37* | (2008.01) |
| *H04H 60/33* | (2008.01) |
| *H04H 60/31* | (2008.01) |

(Continued)

(52) U.S. Cl.
CPC ......... *H04N 21/44204* (2013.01); *H04H 60/29* (2013.01); *H04H 60/31* (2013.01); *H04H 60/33* (2013.01); *H04H 60/37* (2013.01); *H04H 60/40* (2013.01); *H04H 60/43* (2013.01); *H04H 60/74* (2013.01); *H04L 65/4084* (2013.01); *H04L 65/605* (2013.01); *H04L 67/2819* (2013.01); *H04N 5/60* (2013.01); *H04N 21/251* (2013.01); *H04N 21/25883* (2013.01); *H04N 21/44222* (2013.01); *H04N 21/6175* (2013.01); *H04N 21/6582* (2013.01); *H04N 21/8405* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 4,230,990 | A | 10/1980 | Lert, Jr. et al. |
| 4,647,974 | A | 3/1987 | Butler et al. |

(Continued)

FOREIGN PATENT DOCUMENTS

| | | |
|---|---|---|
| AU | 8976601 | 2/2002 |
| AU | 9298201 | 4/2002 |

(Continued)

OTHER PUBLICATIONS

USPTO, "Non-Final Office Action," issued in connection with U.S. Appl. No. 13/341,661, mailed Mar. 19, 2013 (10 pages).

(Continued)

*Primary Examiner* — Jonathan V Lewis
(74) *Attorney, Agent, or Firm* — Hanley, Flight & Zimmerman, LLC

(57) ABSTRACT

Methods and apparatus to measure exposure to streaming media are disclosed herein. An example method includes demultiplexing a closed captioning transport stream from a media stream, the media stream intercepted intermediate a media device and a display. Metadata is extracted from the closed captioning transport stream. At least one of the metadata or data based on the metadata is exported to a media measurement server.

19 Claims, 14 Drawing Sheets

(51) Int. Cl.

| | |
|---|---|
| H04H 60/40 | (2008.01) |
| H04H 60/43 | (2008.01) |
| H04N 5/60 | (2006.01) |
| H04L 29/06 | (2006.01) |
| H04L 29/08 | (2006.01) |
| H04H 60/29 | (2008.01) |
| H04H 60/74 | (2008.01) |
| H04N 21/25 | (2011.01) |
| H04N 21/258 | (2011.01) |
| H04N 21/61 | (2011.01) |
| H04N 21/658 | (2011.01) |
| H04N 21/8405 | (2011.01) |
| H04N 21/845 | (2011.01) |

(56) References Cited

U.S. PATENT DOCUMENTS

| | | | |
|---|---|---|---|
| 4,677,466 A | 6/1987 | Lert, Jr. et al. | |
| 4,697,209 A | 9/1987 | Kiewit et al. | |
| 4,745,468 A | 5/1988 | Von Kohorn | |
| 4,876,592 A | 10/1989 | Von Kohorn | |
| 4,876,736 A | 10/1989 | Kiewit | |
| 4,926,255 A | 5/1990 | Von Kohorn | |
| 4,973,952 A | 11/1990 | Malec et al. | |
| 5,019,899 A | 5/1991 | Boles et al. | |
| 5,023,929 A | 6/1991 | Call | |
| 5,034,807 A | 7/1991 | Von Kohorn | |
| 5,057,915 A | 10/1991 | Von Kohorn | |
| 5,081,680 A | 1/1992 | Bennett | |
| 5,128,752 A | 7/1992 | Von Kohorn | |
| 5,227,874 A | 7/1993 | Von Kohorn | |
| 5,249,044 A | 9/1993 | Von Kohorn | |
| 5,283,734 A | 2/1994 | Von Kohorn | |
| 5,331,544 A | 7/1994 | Lu et al. | |
| 5,401,946 A | 3/1995 | Weinblatt | |
| 5,425,100 A | 6/1995 | Thomas et al. | |
| 5,481,294 A | 1/1996 | Thomas et al. | |
| 5,512,933 A | 4/1996 | Wheatley et al. | |
| 5,524,195 A | 6/1996 | Clanton, III et al. | |
| 5,543,856 A | 8/1996 | Rosser et al. | |
| 5,559,716 A | 9/1996 | Gaalswyk | |
| 5,574,962 A | 11/1996 | Fardeau et al. | |
| 5,579,124 A | 11/1996 | Aijala et al. | |
| 5,594,934 A | 1/1997 | Lu et al. | |
| 5,629,739 A | 5/1997 | Dougherty | |
| 5,659,366 A | 8/1997 | Kerman | |
| 5,666,293 A | 9/1997 | Metz et al. | |
| 5,719,634 A | 2/1998 | Keery et al. | |
| 5,734,413 A | 3/1998 | Lappington et al. | |
| 5,740,035 A | 4/1998 | Cohen et al. | |
| 5,815,671 A | 9/1998 | Morrison | |
| 5,841,978 A | 11/1998 | Rhoads | |
| 5,848,155 A | 12/1998 | Cox | |
| 5,850,249 A | 12/1998 | Massetti et al. | |
| 5,872,588 A | 2/1999 | Aras et al. | |
| 5,880,789 A | 3/1999 | Inaba | |
| 5,893,067 A | 4/1999 | Bender et al. | |
| 5,910,987 A | 6/1999 | Ginter et al. | |
| 5,918,223 A | 6/1999 | Blum et al. | |
| 5,930,369 A | 7/1999 | Cox et al. | |
| 5,933,789 A | 8/1999 | Byun et al. | |
| 5,956,716 A | 9/1999 | Kenner et al. | |
| 5,966,120 A | 10/1999 | Arazi et al. | |
| 5,974,299 A | 10/1999 | Massetti | |
| 5,974,396 A | 10/1999 | Anderson et al. | |
| 5,987,855 A | 11/1999 | Dey et al. | |
| 6,034,722 A | 3/2000 | Viney et al. | |
| 6,049,830 A | 4/2000 | Saib | |
| 6,055,573 A | 4/2000 | Gardenswartz et al. | |
| 6,061,793 A | 5/2000 | Tewfik et al. | |
| 6,088,659 A | 7/2000 | Kelley et al. | |
| 6,108,637 A | 8/2000 | Blumenau | |
| 6,115,654 A | 9/2000 | Eid et al. | |
| 6,154,209 A | 11/2000 | Naughton et al. | |
| 6,208,735 B1 | 3/2001 | Cox et al. | |
| 6,216,129 B1 | 4/2001 | Eldering | |
| 6,282,573 B1 | 8/2001 | Darago et al. | |
| 6,286,036 B1 | 9/2001 | Rhoads | |
| 6,286,140 B1 | 9/2001 | Ivanyi | |
| 6,298,348 B1 | 10/2001 | Eldering | |
| 6,308,327 B1 | 10/2001 | Liu et al. | |
| 6,310,956 B1 | 10/2001 | Morito et al. | |
| 6,331,876 B1 | 12/2001 | Koster et al. | |
| 6,335,736 B1 | 1/2002 | Wagner et al. | |
| 6,363,159 B1 | 3/2002 | Rhoads | |
| 6,389,055 B1 | 5/2002 | August et al. | |
| 6,400,827 B1 | 6/2002 | Rhoads | |
| 6,411,725 B1 | 6/2002 | Rhoads | |
| 6,421,445 B1 | 7/2002 | Jensen et al. | |
| 6,442,285 B2 | 8/2002 | Rhoads et al. | |
| 6,463,445 B1 | 10/2002 | Suzuki et al. | |
| 6,487,564 B1 | 11/2002 | Asai et al. | |
| 6,505,160 B1 | 1/2003 | Levy et al. | |
| 6,512,836 B1 | 1/2003 | Xie et al. | |
| 6,513,014 B1 | 1/2003 | Walker et al. | |
| 6,522,771 B2 | 2/2003 | Rhoads | |
| 6,539,095 B1 | 3/2003 | Rhoads | |
| 6,546,556 B1 | 4/2003 | Kataoka et al. | |
| 6,553,178 B2 | 4/2003 | Abecassis | |
| 6,642,966 B1 | 11/2003 | Limaye | |
| 6,647,269 B2 | 11/2003 | Hendrey et al. | |
| 6,651,253 B2 | 11/2003 | Dudkiewicz et al. | |
| 6,654,480 B2 | 11/2003 | Rhoads | |
| 6,665,873 B1 | 12/2003 | Van Gestel et al. | |
| 6,671,732 B1 | 12/2003 | Weiner | |
| 6,675,383 B1 | 1/2004 | Wheeler et al. | |
| 6,683,966 B1 | 1/2004 | Tian et al. | |
| 6,710,815 B1 | 3/2004 | Billmaier et al. | |
| 6,714,683 B1 | 3/2004 | Tian et al. | |
| 6,714,684 B2 | 3/2004 | Tian et al. | |
| 6,750,985 B2 | 6/2004 | Rhoads | |
| 6,766,523 B2 | 7/2004 | Herley | |
| 6,795,972 B2 | 9/2004 | Rovira | |
| 6,804,379 B2 | 10/2004 | Rhoads | |
| 6,829,368 B2 | 12/2004 | Meyer et al. | |
| 6,853,634 B1 | 2/2005 | Davies et al. | |
| 6,871,323 B2 | 3/2005 | Wagner et al. | |
| 6,873,688 B1 | 3/2005 | Aarnio | |
| 6,941,275 B1 | 9/2005 | Swierczek | |
| 6,956,575 B2 | 10/2005 | Nakazawa et al. | |
| 6,968,315 B1 | 11/2005 | Nakisa | |
| 6,968,564 B1 | 11/2005 | Srinivasan | |
| 6,970,886 B1 | 11/2005 | Conwell et al. | |
| 6,996,213 B1 | 2/2006 | De Jong | |
| 7,003,731 B1 | 2/2006 | Rhoads et al. | |
| 7,007,166 B1 | 2/2006 | Moskowitz et al. | |
| 7,032,178 B1 | 4/2006 | McKnight et al. | |
| 7,050,603 B2 | 5/2006 | Rhoads et al. | |
| 7,051,086 B2 | 5/2006 | Rhoads et al. | |
| 7,058,697 B2 | 6/2006 | Rhoads | |
| 7,082,434 B2 | 7/2006 | Gosselin | |
| 7,095,871 B2 | 8/2006 | Jones et al. | |
| 7,143,949 B1 | 12/2006 | Hannigan | |
| 7,158,943 B2 | 1/2007 | Van der Riet | |
| 7,171,018 B2 | 1/2007 | Rhoads et al. | |
| 7,174,293 B2 | 2/2007 | Kenyon et al. | |
| 7,181,042 B2 | 2/2007 | Tian | |
| 7,185,201 B2 | 2/2007 | Rhoads et al. | |
| 7,194,752 B1 | 3/2007 | Kenyon et al. | |
| 7,197,156 B1 | 3/2007 | Levy | |
| 7,215,280 B1 | 5/2007 | Percy et al. | |
| 7,221,405 B2 | 5/2007 | Basson et al. | |
| 7,227,972 B2 | 6/2007 | Brundage et al. | |
| 7,254,249 B2 | 8/2007 | Rhoads et al. | |
| 7,273,978 B2 | 9/2007 | Uhle | |
| 7,317,716 B1 | 1/2008 | Boni et al. | |
| 7,328,153 B2 | 2/2008 | Wells et al. | |
| 7,346,512 B2 | 3/2008 | Li-Chun Wang et al. | |
| 7,356,700 B2 | 4/2008 | Noridomi et al. | |
| 7,363,278 B2 | 4/2008 | Schmelzer et al. | |
| 7,369,678 B2 | 5/2008 | Rhoads | |
| 7,421,723 B2 | 9/2008 | Harkness et al. | |
| 7,443,292 B2 | 10/2008 | Jensen et al. | |

(56) References Cited

U.S. PATENT DOCUMENTS

| | | |
|---|---|---|
| 7,451,317 B2 | 11/2008 | Oh et al. |
| 7,463,143 B2 | 12/2008 | Forr et al. |
| 7,519,658 B1 | 4/2009 | Anglin et al. |
| 7,592,908 B2 | 9/2009 | Zhang et al. |
| 7,623,823 B2 | 11/2009 | Zito et al. |
| 7,643,090 B2 | 1/2010 | Ramaswamy et al. |
| 7,689,823 B2 | 3/2010 | Shen et al. |
| 7,712,114 B2 | 5/2010 | Ramaswamy |
| 7,761,465 B1 | 7/2010 | Nonaka et al. |
| 7,827,312 B2 * | 11/2010 | Ramaswamy ......... H04H 20/95 709/231 |
| 7,962,934 B1 | 6/2011 | Eldering et al. |
| 8,065,703 B2 * | 11/2011 | Wilson et al. ................ 725/34 |
| 8,103,879 B2 * | 1/2012 | Levy .................. G06F 21/10 713/150 |
| 8,176,322 B2 | 5/2012 | Lee et al. |
| 8,179,475 B2 | 5/2012 | Sandrew |
| 8,451,868 B2 | 5/2013 | Johnson et al. |
| 8,578,272 B2 | 11/2013 | Pantos et al. |
| 8,645,373 B2 | 2/2014 | Knight et al. |
| 8,706,685 B1 | 4/2014 | Smith et al. |
| 8,732,185 B1 | 5/2014 | Lynn et al. |
| 8,839,338 B2 | 9/2014 | Eyer |
| 8,856,869 B1 | 10/2014 | Brinskelle |
| 8,990,844 B2 * | 3/2015 | Oh ..................... H04N 21/4622 725/136 |
| 2001/0031066 A1 | 10/2001 | Meyer et al. |
| 2001/0044851 A1 | 11/2001 | Rothman et al. |
| 2001/0044899 A1 | 11/2001 | Levy |
| 2002/0012443 A1 * | 1/2002 | Rhoads et al. ......... G06Q 30/02 382/100 |
| 2002/0016969 A1 | 2/2002 | Kimble |
| 2002/0032734 A1 | 3/2002 | Rhoads |
| 2002/0033842 A1 | 3/2002 | Zetts |
| 2002/0052885 A1 * | 5/2002 | Levy ................ G06F 17/30067 |
| 2002/0053078 A1 | 5/2002 | Holtz et al. |
| 2002/0056094 A1 | 5/2002 | Dureau |
| 2002/0059218 A1 | 5/2002 | August et al. |
| 2002/0062382 A1 | 5/2002 | Rhoads et al. |
| 2002/0069037 A1 | 6/2002 | Hendrickson et al. |
| 2002/0083324 A1 | 6/2002 | Hirai |
| 2002/0091991 A1 | 7/2002 | Castro |
| 2002/0102993 A1 | 8/2002 | Hendrey et al. |
| 2002/0108125 A1 | 8/2002 | Joao |
| 2002/0111934 A1 | 8/2002 | Narayan |
| 2002/0112002 A1 | 8/2002 | Abato |
| 2002/0120925 A1 | 8/2002 | Logan |
| 2002/0124246 A1 | 9/2002 | Kaminsky et al. |
| 2002/0133705 A1 | 9/2002 | Tagashira et al. |
| 2002/0138852 A1 | 9/2002 | Reynolds et al. |
| 2002/0144262 A1 | 10/2002 | Plotnick et al. |
| 2002/0144273 A1 | 10/2002 | Reto |
| 2002/0150247 A1 | 10/2002 | Linnartz et al. |
| 2002/0157112 A1 | 10/2002 | Kuhn |
| 2002/0162118 A1 | 10/2002 | Levy et al. |
| 2002/0174425 A1 | 11/2002 | Markel et al. |
| 2002/0194592 A1 | 12/2002 | Tsuchida et al. |
| 2002/0197063 A1 | 12/2002 | Cho |
| 2003/0021441 A1 | 1/2003 | Levy et al. |
| 2003/0039465 A1 | 2/2003 | Bjorgan et al. |
| 2003/0055949 A1 | 3/2003 | Coulombe et al. |
| 2003/0079131 A1 | 4/2003 | Reefman |
| 2003/0088674 A1 | 5/2003 | Ullman et al. |
| 2003/0093810 A1 | 5/2003 | Taniguchi |
| 2003/0105870 A1 | 6/2003 | Baum |
| 2003/0108200 A1 | 6/2003 | Sako |
| 2003/0115598 A1 | 6/2003 | Pantoja |
| 2003/0149890 A1 | 8/2003 | Shen et al. |
| 2003/0177488 A1 | 9/2003 | Smith et al. |
| 2003/0185232 A1 | 10/2003 | Moore et al. |
| 2003/0212710 A1 | 11/2003 | Guy |
| 2004/0003394 A1 | 1/2004 | Ramaswamy |
| 2004/0009763 A1 | 1/2004 | Stone et al. |
| 2004/0019690 A1 | 1/2004 | Cardno et al. |
| 2004/0025181 A1 | 2/2004 | Addington et al. |
| 2004/0037271 A1 | 2/2004 | Liscano et al. |
| 2004/0038692 A1 | 2/2004 | Muzaffar |
| 2004/0064319 A1 | 4/2004 | Neuhauser et al. |
| 2004/0073916 A1 | 4/2004 | Petrovic et al. |
| 2004/0073951 A1 | 4/2004 | Bae et al. |
| 2004/0088556 A1 | 5/2004 | Weirauch |
| 2004/0125125 A1 | 7/2004 | Levy |
| 2004/0128514 A1 | 7/2004 | Rhoads |
| 2004/0137929 A1 | 7/2004 | Jones et al. |
| 2004/0146161 A1 | 7/2004 | De Jong |
| 2004/0153649 A1 * | 8/2004 | Rhoads et al. ................ 713/176 |
| 2004/0156489 A1 | 8/2004 | Vishik et al. |
| 2004/0199387 A1 | 10/2004 | Wang et al. |
| 2004/0254887 A1 | 12/2004 | Jacoby |
| 2005/0028189 A1 | 2/2005 | Heine et al. |
| 2005/0033758 A1 | 2/2005 | Baxter |
| 2005/0058319 A1 | 3/2005 | Rhoads et al. |
| 2005/0086682 A1 | 4/2005 | Burges et al. |
| 2005/0138179 A1 | 6/2005 | Encarnacion et al. |
| 2005/0144004 A1 | 6/2005 | Bennett et al. |
| 2005/0152287 A1 | 7/2005 | Yokomitsu et al. |
| 2005/0177738 A1 | 8/2005 | Van Der Veen et al. |
| 2005/0188297 A1 | 8/2005 | Knight et al. |
| 2005/0192933 A1 | 9/2005 | Rhoads et al. |
| 2005/0193425 A1 | 9/2005 | Sull et al. |
| 2005/0204379 A1 | 9/2005 | Yamamori |
| 2005/0216346 A1 | 9/2005 | Kusumoto et al. |
| 2005/0234774 A1 | 10/2005 | Dupree |
| 2006/0026431 A1 | 2/2006 | Campello De Souza |
| 2006/0031297 A1 | 2/2006 | Zuidema |
| 2006/0056625 A1 | 3/2006 | Nakabayashi et al. |
| 2006/0059277 A1 | 3/2006 | Zito et al. |
| 2006/0062426 A1 | 3/2006 | Levy et al. |
| 2006/0095401 A1 | 5/2006 | Krikorian et al. |
| 2006/0107195 A1 | 5/2006 | Ramaswamy et al. |
| 2006/0107302 A1 | 5/2006 | Zdepski |
| 2006/0136564 A1 | 6/2006 | Ambrose |
| 2006/0161635 A1 | 7/2006 | Lamkin et al. |
| 2006/0167747 A1 | 7/2006 | Goodman et al. |
| 2006/0168613 A1 | 7/2006 | Wood et al. |
| 2006/0195614 A1 | 8/2006 | Sena et al. |
| 2006/0195886 A1 | 8/2006 | Ashley |
| 2006/0212705 A1 * | 9/2006 | Thommana et al. ......... 713/176 |
| 2006/0221173 A1 | 10/2006 | Duncan |
| 2006/0224798 A1 | 10/2006 | Klein et al. |
| 2006/0242325 A1 | 10/2006 | Ramaswamy et al. |
| 2007/0006250 A1 | 1/2007 | Croy et al. |
| 2007/0016918 A1 | 1/2007 | Alcorn et al. |
| 2007/0055987 A1 | 3/2007 | Lu et al. |
| 2007/0074020 A1 | 3/2007 | Nishimura |
| 2007/0083611 A1 | 4/2007 | Farago et al. |
| 2007/0110089 A1 | 5/2007 | Essafi et al. |
| 2007/0112837 A1 | 5/2007 | Houh et al. |
| 2007/0118375 A1 | 5/2007 | Kenyon et al. |
| 2007/0118873 A1 | 5/2007 | Houh et al. |
| 2007/0124771 A1 | 5/2007 | Shvadron |
| 2007/0127717 A1 | 6/2007 | Herre et al. |
| 2007/0129952 A1 | 6/2007 | Kenyon et al. |
| 2007/0133223 A1 | 6/2007 | Fredley et al. |
| 2007/0136753 A1 | 6/2007 | Bovenschulte et al. |
| 2007/0136777 A1 | 6/2007 | Hasek et al. |
| 2007/0149114 A1 | 6/2007 | Danilenko |
| 2007/0157262 A1 | 7/2007 | Ramaswamy et al. |
| 2007/0162927 A1 | 7/2007 | Ramaswamy et al. |
| 2007/0186228 A1 | 8/2007 | Ramaswamy et al. |
| 2007/0186288 A1 | 8/2007 | Peterson et al. |
| 2007/0198738 A1 | 8/2007 | Angiolillo et al. |
| 2007/0201835 A1 | 8/2007 | Rhoads |
| 2007/0226760 A1 | 9/2007 | Neuhauser et al. |
| 2007/0250901 A1 * | 10/2007 | McIntire et al. ............. 725/146 |
| 2007/0274523 A1 | 11/2007 | Rhoads |
| 2007/0276925 A1 | 11/2007 | La Joie et al. |
| 2007/0276926 A1 | 11/2007 | La Joie et al. |
| 2007/0288476 A1 | 12/2007 | Flanagan et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0027734 A1 | 1/2008 | Zhao et al. |

(56) References Cited

U.S. PATENT DOCUMENTS

| | | |
|---|---|---|
| 2008/0028223 A1 | 1/2008 | Rhoads |
| 2008/0040354 A1 | 2/2008 | Ray et al. |
| 2008/0046499 A1 | 2/2008 | Cabrera et al. |
| 2008/0059160 A1 | 3/2008 | Saunders et al. |
| 2008/0065507 A1 | 3/2008 | Morrison et al. |
| 2008/0077956 A1 | 3/2008 | Morrison et al. |
| 2008/0082510 A1 | 4/2008 | Wang et al. |
| 2008/0082922 A1 | 4/2008 | Biniak et al. |
| 2008/0083003 A1 | 4/2008 | Biniak et al. |
| 2008/0104624 A1 | 5/2008 | Narasimhan et al. |
| 2008/0120661 A1 | 5/2008 | Ludvig et al. |
| 2008/0133223 A1 | 6/2008 | Son et al. |
| 2008/0133504 A1 | 6/2008 | Messer et al. |
| 2008/0134232 A1 | 6/2008 | Rhoads |
| 2008/0139182 A1 | 6/2008 | Levy et al. |
| 2008/0140573 A1 | 6/2008 | Levy et al. |
| 2008/0168503 A1 | 7/2008 | Sparrell |
| 2008/0184132 A1 | 7/2008 | Zato |
| 2008/0200999 A1 | 8/2008 | Hakansson |
| 2008/0209491 A1 | 8/2008 | Hasek |
| 2008/0219496 A1 | 9/2008 | Tewfik et al. |
| 2008/0219637 A1 | 9/2008 | Sandrew |
| 2008/0235077 A1 | 9/2008 | Harkness et al. |
| 2008/0235209 A1 | 9/2008 | Rathod et al. |
| 2008/0240490 A1 | 10/2008 | Finkelstein et al. |
| 2008/0249961 A1 | 10/2008 | Harkness et al. |
| 2008/0310629 A1 | 12/2008 | Van Der Veen et al. |
| 2009/0007169 A1* | 1/2009 | Headley et al. ............ 725/14 |
| 2009/0015599 A1 | 1/2009 | Bennett et al. |
| 2009/0070408 A1 | 3/2009 | White |
| 2009/0083417 A1 | 3/2009 | Hughes et al. |
| 2009/0086812 A1 | 4/2009 | Ducharme |
| 2009/0103887 A1 | 4/2009 | Choi et al. |
| 2009/0119723 A1 | 5/2009 | Tinsman |
| 2009/0129588 A1 | 5/2009 | Takakusu et al. |
| 2009/0133093 A1 | 5/2009 | Hodge |
| 2009/0150553 A1 | 6/2009 | Collart et al. |
| 2009/0158318 A1 | 6/2009 | Levy |
| 2009/0164564 A1 | 6/2009 | Willis |
| 2009/0228492 A1 | 9/2009 | Valdez et al. |
| 2009/0248886 A1 | 10/2009 | Tan et al. |
| 2009/0259325 A1 | 10/2009 | Topchy et al. |
| 2009/0265214 A1 | 10/2009 | Jobs et al. |
| 2009/0276313 A1 | 11/2009 | Wilhelm |
| 2009/0307061 A1 | 12/2009 | Monighetti et al. |
| 2009/0307084 A1 | 12/2009 | Monighetti et al. |
| 2010/0008586 A1 | 1/2010 | Meyer et al. |
| 2010/0009722 A1 | 1/2010 | Levy et al. |
| 2010/0023405 A1 | 1/2010 | Liu |
| 2010/0088583 A1 | 4/2010 | Schachter |
| 2010/0094897 A1 | 4/2010 | Sumrall et al. |
| 2010/0121936 A1 | 5/2010 | Liu et al. |
| 2010/0135638 A1 | 6/2010 | Mio |
| 2010/0174774 A1 | 7/2010 | Kern et al. |
| 2010/0226526 A1 | 9/2010 | Modro et al. |
| 2010/0241963 A1 | 9/2010 | Kulis et al. |
| 2010/0262711 A1 | 10/2010 | Bouazizi |
| 2010/0280641 A1 | 11/2010 | Harkness et al. |
| 2010/0306257 A1 | 12/2010 | Levy |
| 2010/0318600 A1 | 12/2010 | Furbeck |
| 2011/0016231 A1 | 1/2011 | Ramaswamy et al. |
| 2011/0030031 A1 | 2/2011 | Lussier et al. |
| 2011/0055314 A1 | 3/2011 | Rosenstein et al. |
| 2011/0078721 A1 | 3/2011 | Wang et al. |
| 2011/0123062 A1 | 5/2011 | Hilu |
| 2011/0145246 A1 | 6/2011 | Prager et al. |
| 2011/0145581 A1 | 6/2011 | Malhotra et al. |
| 2011/0154185 A1 | 6/2011 | Kern et al. |
| 2011/0173200 A1 | 7/2011 | Yang et al. |
| 2011/0196921 A1 | 8/2011 | Sylthe |
| 2011/0252118 A1 | 10/2011 | Pantos et al. |
| 2011/0320287 A1 | 12/2011 | Holt et al. |
| 2011/0321003 A1 | 12/2011 | Doig et al. |
| 2012/0023516 A1 | 1/2012 | Wolinsky et al. |
| 2012/0036350 A1 | 2/2012 | Kuno et al. |
| 2012/0045054 A1 | 2/2012 | Main et al. |
| 2012/0096546 A1 | 4/2012 | Dilley et al. |
| 2012/0124605 A1 | 5/2012 | Praden |
| 2012/0137015 A1* | 5/2012 | Sun ............................... 709/231 |
| 2012/0265735 A1 | 10/2012 | McMillan et al. |
| 2012/0284804 A1 | 11/2012 | Lindquist et al. |
| 2012/0308071 A1 | 12/2012 | Ramsdell et al. |
| 2012/0311126 A1 | 12/2012 | Jadallah et al. |
| 2013/0007298 A1 | 1/2013 | Ramaswamy et al. |
| 2013/0007794 A1 | 1/2013 | Besehanic et al. |
| 2013/0054972 A1 | 2/2013 | Thorwirth |
| 2013/0061275 A1 | 3/2013 | Seo et al. |
| 2013/0073960 A1 | 3/2013 | Eppolito et al. |
| 2013/0097285 A1 | 4/2013 | van Zwol et al. |
| 2013/0124747 A1 | 5/2013 | Harrang et al. |
| 2013/0166868 A1 | 6/2013 | Jarnikov et al. |
| 2013/0202150 A1 | 8/2013 | Sinha et al. |
| 2013/0205319 A1* | 8/2013 | Sinha .................... G06T 1/0021 725/14 |
| 2013/0226942 A1 | 8/2013 | Denoual et al. |
| 2013/0231931 A1 | 9/2013 | Kulis et al. |
| 2013/0247078 A1* | 9/2013 | Nikankin et al. ............... 725/13 |
| 2013/0268623 A1 | 10/2013 | Besehanic et al. |
| 2013/0268630 A1 | 10/2013 | Besehanic et al. |
| 2013/0290508 A1 | 10/2013 | Besehanic et al. |
| 2013/0291001 A1* | 10/2013 | Besehanic et al. ........ H04N 21/44204 725/20 |
| 2013/0297410 A1 | 11/2013 | Oh et al. |
| 2013/0297737 A1 | 11/2013 | Wajs et al. |
| 2013/0311776 A1 | 11/2013 | Besehanic |
| 2013/0311780 A1 | 11/2013 | Besehanic |
| 2014/0082220 A1 | 3/2014 | Ramaswamy et al. |
| 2014/0105392 A1 | 4/2014 | Robert et al. |
| 2014/0229970 A1 | 8/2014 | Besehanic |
| 2014/0244828 A1 | 8/2014 | Besehanic |
| 2014/0298365 A1 | 10/2014 | Matsubara et al. |
| 2014/0301386 A1 | 10/2014 | Harrenstien et al. |
| 2015/0222939 A1 | 8/2015 | Gallant et al. |
| 2016/0043916 A1 | 2/2016 | Ramaswamy et al. |

FOREIGN PATENT DOCUMENTS

| | | |
|---|---|---|
| AU | 2003230993 | 11/2003 |
| AU | 2006203639 | 9/2006 |
| BR | 0112901 | 6/2003 |
| BR | 0309598 | 2/2005 |
| CA | 2483104 | 11/2003 |
| CN | 1592906 | 3/2005 |
| CN | 1647160 | 7/2005 |
| CN | 101115124 | 1/2008 |
| EP | 0769749 | 4/1997 |
| EP | 1176826 | 1/2002 |
| EP | 1349370 | 10/2003 |
| EP | 1406403 | 4/2004 |
| EP | 1307833 | 6/2006 |
| EP | 1745464 | 10/2007 |
| EP | 1853026 | 11/2007 |
| EP | 1704695 | 2/2008 |
| EP | 1504445 | 8/2008 |
| JP | 2002247610 | 8/2002 |
| JP | 2003524199 | 8/2003 |
| JP | 2004320752 | 11/2004 |
| WO | 95/27349 | 10/1995 |
| WO | 97/02672 | 1/1997 |
| WO | 00/04662 | 1/2000 |
| WO | 00/19699 | 4/2000 |
| WO | 01/19088 | 3/2001 |
| WO | 01/24027 | 4/2001 |
| WO | 01/31497 | 5/2001 |
| WO | 01/40963 | 6/2001 |
| WO | 01/46782 | 6/2001 |
| WO | 0146782 | 6/2001 |
| WO | 01/53922 | 7/2001 |
| WO | 01/75743 | 10/2001 |
| WO | 01/91109 | 11/2001 |
| WO | 02/05517 | 1/2002 |
| WO | 03/009277 | 1/2002 |
| WO | 02/11123 | 2/2002 |

(56) References Cited

FOREIGN PATENT DOCUMENTS

| WO | 02/15081 | 2/2002 |
|---|---|---|
| WO | 02/17591 | 2/2002 |
| WO | 02/19625 | 3/2002 |
| WO | 02/27600 | 4/2002 |
| WO | 02/37381 | 5/2002 |
| WO | 02/45034 | 6/2002 |
| WO | 02/061652 | 8/2002 |
| WO | 02/065305 | 8/2002 |
| WO | 02/065318 | 8/2002 |
| WO | 02/069121 | 9/2002 |
| WO | 03/091990 | 11/2003 |
| WO | 03/094499 | 11/2003 |
| WO | 03/096337 | 11/2003 |
| WO | 2004/010352 | 1/2004 |
| WO | 2004/040416 | 5/2004 |
| WO | 2004/040475 | 5/2004 |
| WO | 2004/061699 | 7/2004 |
| WO | 2005/025217 | 3/2005 |
| WO | 2005/064885 | 7/2005 |
| WO | 2005/101243 | 10/2005 |
| WO | 2005/111998 | 11/2005 |
| WO | 2006/012241 | 2/2006 |
| WO | 2006/025797 | 3/2006 |
| WO | 2007/056531 | 5/2007 |
| WO | 2007/056532 | 5/2007 |
| WO | 2008/042953 | 4/2008 |
| WO | 2008/044664 | 4/2008 |
| WO | 2008/045950 | 4/2008 |
| WO | 2008/110002 | 9/2008 |
| WO | 2008/110790 | 9/2008 |
| WO | 2009/011206 | 1/2009 |
| WO | 2009/061651 | 5/2009 |
| WO | 2009/064561 | 5/2009 |
| WO | 2010095320 | 8/2010 |
| WO | 2010/127268 | 11/2010 |
| WO | 2012177866 | 12/2012 |
| WO | 2012177870 | 12/2012 |
| WO | 2012177872 | 12/2012 |
| WO | 2012177874 | 12/2012 |

OTHER PUBLICATIONS

USPTO, "Restriction," issued in connection with U.S. Appl. No. 13/181,147, mailed Aug. 10, 2012 (4 pages).
USPTO, "Non-Final Office Action," issued in connection with U.S. Appl. No. 13/181,147, mailed Nov. 21, 2012 (30 pages).
U.S. Appl. No. 13/778,108, filed Feb. 26, 2013 (66 pages).
U.S. Appl. No. 13/793,991, filed Mar. 11, 2013 (47 pages).
U.S. Appl. No. 13/443,596, filed Apr. 10, 2012 (50 pages).
CIPO, "Office Action," issued in connection with Canadian Application Serial No. 2,574,998, mailed Aug. 26, 2008 (4 pages).
CIPO, "Office Action," issued in connection with Canadian Application Serial No. 2,574,998, mailed Mar. 23, 2009 (5 pages).
CIPO, "Office Action," issued in connection with Canadian Application Serial No. 2,574,998, mailed Nov. 13, 2009 (10 pages).
Patent Cooperation Treaty, "International Search Report," issued in connection with International Application Serial No. PCT/US2003/14970, mailed Feb. 10, 2004 (1 page).
Patent Cooperation Treaty, "International Preliminary Examination Report," issued in connection with International Application Serial No. PCT/US2003/014970, completed Aug. 21, 2004 (6 pages).
Patent Cooperation Treaty, "International Search Report," issued in connection with International Application Serial No. PCT/US2003/031180, mailed Jun. 8, 2004 (5 pages).
Patent Cooperation Treaty, "International Preliminary Examination Report," issued in connection with International Application Serial No. PCT/US2003/031180, mailed Aug. 17, 2004 (4 pages).
Patent Cooperation Treaty, "International Search Report and Written Opinion," issued in connection with International Application Serial No. PCT/US2005/026426, mailed Aug. 18, 2006 (10 pages).
Patent Cooperation Treaty, "International Preliminary Report on Patentability," issued in connection with International Application Serial No. PCT/US2005/026426, mailed Feb. 1, 2007 (9 pages).
Patent Cooperation Treaty, "International Search Report and Written Opinion," issued in connection with International Application Serial No. PCT/US2009/061827, mailed Mar. 15, 2010 (12 pages).
Patent Cooperation Treaty, "International Search Report and Written Opinion," issued in connection with International Application Serial No. PCT/US2009/061750, mailed Mar. 3, 2010 (10 pages).
Patent Cooperation Treaty, International Search Report and Written Opinion, issued in connection with International Application Serial No. PCT/US2010/033201, mailed Oct. 1, 2010 (16 pages).
Patent Cooperation Treaty, "International Search Report and Written Opinion," issued in connection with International Application Serial No. PCT/US2009/061479, mailed May 26, 2010 (15 pages).
Patent Cooperation Treaty, "International Search Report and Written Opinion ", issued in connection with International application No. PCT/US2012/043546, mailed Dec. 10, 2012, (6 pages).
Patent Cooperation Treaty, "International Search Report and Written Opinion", issued in connection with International application No. PCT/US2012/043539, mailed Jan. 17, 2013, (9 pages).
Patent Cooperation Treaty, "International Search Report and Written Opinion", issued in connection with International application No. PCT/US2012/043544, mailed Jan. 17, 2013, (15 pages).
Shazam, "Shazam and VidZone Digital Media announce UK1s first fixed price mobile download service for music videos," http://www.shazam.com/music/web/newsdetail.html?nid=NEWS136, Feb. 11, 2008 (1 page).
Shazam, "Shazam launches new music application for Facebook fans," http://www.shazam.com/music/web/newsdetail.html?nid=NEWS135, Feb. 18, 2008 (1 page).
Shazam, "Shazam turns up the volume on mobile music," http://www.shazam.com/music/web/newsdetail.html?nid=NEWS137, Nov. 28, 2007 (1 page).
Shazam, Company summary outline and list of products, undated (1 page).
Stross, "Apple Wouldn't Risk Its Cool Over a Gimmick, Would It?," The New York Times, Nov. 14, 2009 (3 pages).
Stultz, "Handheld Captioning at Disney World Theme Parks," article retrieved on Mar. 8, 2013, http://goflorida.about.com/od/disneyworld/a/wdw_captioning.htm, (1 page).
Sullivan, "Google Cozies Up to SMBs for Digital Content," MediaPost News, Mar. 19, 2009 (3 pages).
U.S. Appl. No. 61/499,520, filed Jun. 21, 2011, (51 pages).
U.S. Appl. No. 61/568,631, filed Dec. 8, 2011, (80 pages).
USPTO, "Advisory Action," issued in connection with U.S. Appl. No. 10/540,611, mailed Jan. 22, 2010 (4 pages).
USPTO, "Final Office Action," issued in connection with U.S. Appl. No. 10/540,611, mailed Sep. 29, 2009 (36 pages).
USPTO, "Non-Final Office Action," issued in connection with U.S. Appl. No. 10/540,611, mailed Mar. 4, 2009 (33 pages).
USPTO, "Non-Final Office Action," issued in connection with U.S. Appl. No. 10/540,611, mailed Sep. 15, 2008 (22 pages).
USPTO, "Non-Final Office Action," issued in connection with U.S. Appl. No. 12/890,216, mailed Apr. 2, 2012 (33 pages).
USPTO, "Notice of Allowance," issued in connection with U.S. Appl. No. 10/540,611, mailed Jun. 22, 2010 (26 pages).
USPTO, "Advisory Action," issued in connection with U.S. Appl. No. 11/618,245, mailed Sep. 30, 2009 (4 pages).
USPTO, "Final Office Action," issued in connection with U.S. Appl. No. 10/530,233, mailed Mar. 18, 2010 (23 pages).
USPTO, "Final Office Action," issued in connection with U.S. Appl. No. 11/618,245, mailed Jul. 21, 2009 (31 pages).
USPTO, "Non-Final Office Action," issued in connection with U.S. Appl. No. 10/530,233, mailed Sep. 16, 2009 (31 pages).
USPTO, "Non-Final Office Action," issued in connection with U.S. Appl. No. 11/618,245, mailed Feb. 5, 2009 (48 pages).
Van Beek et al., "Metadata-Driven Multimedia Access," IEEE Signal Processing Magazine, vol. 20, No. 2, Institute of Electric and Electronic Engineers, Inc., New York, New York, USA, Mar. 2003 (13 pages).
Vetro et al., "Video Transcoding Architectures and Techniques: An Overview," IEEE Signal Processing Magazine, vol. 20, No. 2, Institute of Electric and Electronic Engineers, Inc., New York, New York, USA, Mar. 2003 (12 pages).

(56) References Cited

OTHER PUBLICATIONS

Wactlar et al., "Digital Video Archives: Managing Through Metadata" Building a National Strategy for Digital Preservation: Issues in Digital Media Archiving, http://www.informedia.cs.cmu.edu/documents/Wactlar-CLIR-final.pdf, Apr. 2002 (14 pages).
Wang, "An Industrial-Strength Audio Search Algorithm," Shazam Entertainment, Ltd., in Proceedings of the Fourth International Conference on Music Information Retrieval, Baltimore, Oct. 26-30, 2003 (7 pages).
USPTO, "Non-Final Office Action," issued in connection with U.S. Appl. No. 12/890,216, mailed Nov. 29, 2012 (22 pages).
USPTO, "Requirement for Restriction," issued in connection with U.S. Appl. No. 10/530,233, mailed Jun. 10, 2009 (20 pages).
USPTO, "Non-Final Office Action," issued in connection with U.S. Appl. No. 11/618,245, mailed Apr. 28, 2011 (48 pages).
USPTO, "Final Office Action," issued in connection with U.S. Appl. No. 11/618,245, mailed Oct. 26, 2011 (38 pages).
United States Patent and Trademark Office, "Notice of Allowance," issued in connection with U.S. Appl. No. 12/890,216 on Aug. 6, 2013, 14 pages.
United States Patent and Trademark Office, "Office Action," issued in connection with U.S. Appl. No. 13/181,147 on Aug. 15, 2013, 46 pages.
United States Patent and Trademark Office, "Office Action," issued in connection with U.S. Appl. No. 13/472,170 on Nov. 8, 2013, 17 pages.
United States Patent and Trademark Office, "Office Action," issued in connection with U.S. Appl. No. 13/793,983 on Nov. 8, 2013, 13 pages.
United States Patent and Trademark Office, "Office Action," issued in connection with U.S. Appl. No. 13/443,596 on Nov. 21, 2013, 25 pages.
United States Patent and Trademark Office, "Office Action," issued in connection with U.S. Appl. No. 13/793,991 on Dec. 6, 2013, 21 pages.
Patent Cooperation Treaty, "International Search Report and Written Opinion," issued in connection with International application No. PCT/US2012/043535, dated Feb. 21, 2013, 15 pages.
United States Patent and Trademark Office, "Notice of Allowance," issued in connection with U.S. Appl. No. 13/341,661 on Sep. 23, 2013, 9 pages.
Canadian Intellectual Property Office, "Office Action," issued in connection with application No. CA 2,773,567, on Mar. 6, 2014, 2 pages.
State Intellectual Property Office of China, "First Office Action," issued in connection with application No. CN 201210105474.3, on Feb. 8, 2014, 15 pages.
United States Patent and Trademark Office, "Final Office Action", issued in connection with U.S. Appl. No. 13/181,147, dated Mar. 10, 2014 (48 pages).
United States Patent and Trademark Office, "Final Office Action", issued in connection with U.S. Appl. No. 13/443,596, dated Apr. 9, 2014 (20 pages).
United States Patent and Trademark Office, "Final Office Action", issued in connection with U.S. Appl. No. 13/793,991, dated Apr. 11, 2014 (15 pages).
United States Patent and Trademark Office, "Non-Final Office Action", issued in connection with U.S. Appl. No. 131341,646, dated Jun. 5, 2014 (17 pages).
United States Patent and Trademark Office, "Final Office Action", issued in connection with U.S. Appl. No. 13/793,983, dated Jun. 6, 2014 (13 pages).
United States Patent and Trademark Office, "Final Office Action", issued in connection with U.S. Appl. No. 13/472,170, dated Jun. 18, 2014 (18 pages).
IP Australia, "Examination Report", issued in connection with Australian Patent Application No. 2012272868, dated Jun. 27, 2014 (3 pages).
IP Australia, "Examination Report", issued in connection with Australian Patent Application No. 2012272874, dated Jun. 27, 2014 (3 pages).
IP Australia, "Examination Report", issued in connection with Australian Patent Application No. 2012272872, dated Jun. 24, 2014 (4 pages).
International Bureau, "International Preliminary Report on Patentability" issued in connection with International Application No. PCT/US20121043544, dated Jan. 9, 2014 (9 pages).
United States Patent and Trademark Office, "Notice of Allowance", issued in connection with U.S. Appl. No. 13/341,661 dated Jul. 8, 2014 (8 pages).
"Video: timed text tracks", Windows Internet Explorer, Microsoft, 2012, http://msdn.microsoft.com/en-us/library/ie/hh673566(v=vs.85).aspx, (6 pages).
R. Pantos, Ed., & W. May, Apple Inc. "HTTP Live Streaming: draft-pantos-http-live-streaming-07", Sep. 2011, (33 pages).
Apple Inc. "Timed Metadata for HTTP Live Streaming", Apr. 28, 2011, (12 pages).
Apple Inc. "HTTP Live Streaming Overview", Apr. 1, 2011, (36 pages).
Eric Winkelman, "Timed Text Tracks and TV Services", Aug. 15, 2011, (5 pages).
"What is Jacked?," http://www.jacked.com/, retrieved on Dec. 3, 2009 (1 page).
Anderson, "Google to compete with Nielsen for TV-ratings info?," Ars Technica, Jun. 19, 2006 (3 pages).
Boehret, "Yahoo Widgets Lend Brains to Boob Tube," The Wall Street Journal, Mar. 25, 2009 (4 pages).
Claburn, "Google Researchers Propose TV Monitoring," Information Week, Jun. 7, 2006 (4 pages).
Evain, "TV—Anytime Metadata—A Preliminary Specification on Schedule!," EBU Technical Review, Sep. 2000 (15 pages).
Fink et al., "Social- and Interactive-Television Applications Based on Real-Time Ambient-Audio Identification," EuroITV, 2006 (10 pages).
Heuer et al., "Adaptive Multimedia Messaging based on MPEG-7—The M3-Box,", Proc. Second Int'l Symposium on Mobile Multimedia Systems Applications, Nov. 9-10, 2000 (8 pages).
Heussner, "Sound-Triggered Smart Phone Ads Seek You Out,"Adweek.com, http://www.adweek.com/news/advertising-branding/sound-triggered-smartphone-ads-seek-you-out-136901, Dec. 7, 2011 (3 pages).
Hopper, "EBU Project Group P/META Metadata Exchange Standards," EBU Technical Review, Sep. 2000 [http://www.ebu.ch/en/technical/trev/trev_284-contents.html, retrieved on Jul. 20, 2006] (25 pages).
Kane, "Entrepreneur Plans On-Demand Videogame Service," The Wall Street Journal, Mar. 24, 2009 (2 pages).
Laven,"EBU Technical Review (Editorial)," No. 284, Sep. 2000 [http://www.ebu.ch/en/technical/trev/trev_284-contents.html, retrieved on Jul. 20, 2006] (3 pages).
Mulder, "The Integration of Metadata From Production to Consumer," EBU Technical Review, Sep. 2000 [http://www.ebu.ch/en/technical/trev/trev_284-contents.html, retrieved on Jul. 20, 2006] (6 pages).
U.S. Appl. No. 13/455,961, filed Apr. 25, 2012, (61 pages).
U.S. Appl. No. 13/793,983, filed Mar. 11, 2013, (68 pages).
U.S. Appl. No. 13/472,170, filed May 15, 2012, (72 pages).
U.S. Appl. No. 13/793,974, filed Mar. 11, 2013, (58 pages).
U.S. Appl. No. 13/767,548, filed Feb. 14, 2013, (68 pages).
United States Patent and Trademark Office, 'Notice of Allowance,' Issued in connection with U.S. Appl. No. 13/341,646, dated Jun. 19, 2015, (9 Pages).
IP Australia, "Examination Report", issued in connection with Australian Patent Application No. 2013204488, dated Aug. 12, 2014 (5 pages).
IP Australia, "Examination Report", issued in connection with Australian Patent Application No. 2013203778, dated Aug. 21, 2014 (5 pages).
IP Australia, "Examination Report", issued in connection with Australian Patent Application No. 2012272876, dated Sep. 18, 2014 (4 pages).

(56) References Cited

OTHER PUBLICATIONS

United States Patent and Trademark Office, "Non-Final Office Action", issued in connection with U.S. Appl. No. 131443,596, dated Sep. 25, 2014 (22 pages).
United States Patent and Trademark Office, "Notice of Allowance", issued in connection with U.S. Appl. No. 13/341,646, dated Nov. 3, 2014 (10 pages).
United States Patent and Trademark Office, "Non-Final Office Action", issued in connection with U.S. Appl. No. 13/455,961, dated Dec. 5, 2014 (13 pages).
United States Patent and Trademark Office, "Notice of Allowance", issued in connection with U.S. Appl. No. 13/472,170, dated Dec. 5, 2014 (12 pages).
United States Patent and Trademark Office, "Non-Final Office Action", issued in connection with U.S. Appl. No. 13/793,991, dated Nov. 10, 2014 (19 pages).
United States Patent and Trademark Office, "Notice of Allowance", issued in connection with U.S. Appl. No. 13/793,983, dated Jan. 9, 2015 (12 pages).
United States Patent and Trademark Office, "Final Office Action", issued in connection with U.S. Appl. No. 13/793,991, dated Feb. 27, 2015 (21 pages).
United States Patent and Trademark Office, "Non-Final Office Action", issued in connection with U.S. Appl. No. 13/778,108, dated Feb. 27, 2015 (13 pages).
United States Patent and Trademark Office, "Non-Final Office Action", issued in connection with U.S. Appl. No. 13/341,646, dated Mar. 3, 2015 (7 pages).
Japanese Patent Office, "Notice of Reasons for Rejection", issued in connection with Japanese Patent Application No. P2014-517158, dated Mar. 3, 2015 (7 pages).
Mexican Patent Office, "Notice of Allowance", issued in connection with Mexican Patent Application No. MX/a/2014/000281, dated Feb. 25, 2015 (1 pages).
United States Patent and Trademark Office, "Notice of Allowance", issued in connection with U.S. Appl. No. 13/793,983, dated Mar. 16, 2015 (9 pages).
United States Patent and Trademark Office, "Notice of Allowance", issued in connection with U.S. Appl. No. 13/472,170, dated Mar. 26, 2015 (10 pages).
United States Patent and Trademark Office, "Final Office Action", issued in connection with U.S. Appl. No. 13/341,661, dated Mar. 26, 2015 (13 pages).
United States Patent and Trademark Office, "Final Office Action", issued in connection with U.S. Appl. No. 13/455,961, dated May 20, 2015 (14 pages).
State Intellectual Property Office, "Notice of Allowance" issued in connection with Application No. 201210105474.3 , May 25, 2015, 5 pages.
United States Patent and Trademark Office, "Non-Final Office Action", issued in connection with U.S. Appl. No. 13/767,548, dated Feb. 3, 2015 (10 pages).
United States Patent and Trademark Office, "Examiner's Answer to Appeal Brief", issued in connection with U.S. Appl. No. 13/181,147, dated Dec. 22, 2014 (34 pages).
United States Patent and Trademark Office, "Non-Final Office Action", issued in connection with U.S. Appl. No. 13/793,974, dated Feb. 18, 2015 (12 pages).
Mexican Patent Office, "Office Action", issued in connection with Mexican Patent Application No. MX/a/2014/000280, dated Jan. 21, 2015 (5 pages, English translation included).
United States Patent and Trademark Office, "Corrected Notice of Allowance", issued in connection with U.S. Appl. No. 13/472,170, dated Feb. 12, 2015 (5 pages).
United States Patent and Trademark Office, "Final Office Action", issued in connection with U.S. Appl. No. 13/443,596, dated Feb. 26, 2015 (25 pages).
European Patent Office, "European Search Report", issued in connection with European Patent Application No. 12803215.8, dated Apr. 20, 2015 (9 pages).

Canadian Patent Office, "Office Action", issued in connection with Canadian Patent Application No. 2,840,092, dated Apr. 20, 2015 (4 pages).
United States Patent and Trademark Office, "Notice of Allowance", issued in connection with U.S. Appl. No. 13/341,646, dated Jun. 19, 2015 (9 pages).
United States Patent and Trademark Office, "Notice of Allowance", issued in connection with U.S. Appl. No. 13/472,170, dated Jul. 7, 2015 (9 pages).
United States Patent and Trademark Office, "Notice of Allowance", issued in connection with U.S. Appl. No. 13/793,983, dated Jul. 7, 2015 (10 pages).
Mexican Patent Office, "Notice of Allowance", issued in connection with Mexican Patent Application No. MX/a/2014/000280, dated Jun. 12, 2015 (1 page).
European Patent Office, "European Search Report" issued in connection with European Patent Application No. 12802202.7 dated May 28, 2015 (7 pages).
IP Australia, "Notice of Acceptance", issued in connection with Australian Patent Application No. 2012272868, dated Jul. 22, 2015 (2 pages).
United States Patent and Trademark Office, "Final Office Action", issued in connection with U.S. Appl. No. 13/793,974, dated May 28, 2015 (13 pages).
Canadian Intellectual Property Office, "Office Action", issued in connection with Canadian Patent Application No. 2,840,094, dated May 19, 2015 (4 pages).
United States Patent and Trademark Office, "Non-Final Office Action", issued in connection with U.S. Appl. No. 14/089,279, dated Mar. 28, 2014 (13 pages).
United States Patent and Trademark Office, "Final Office Action", issued in connection with U.S. Appl. No. 14/089,279, dated Nov. 21, 2014 (22 pages).
United States Patent and Trademark Office, "Non-Final Office Action", issued in connection with U.S. Appl. No. 14/089,279, dated Apr. 23, 2015 (23 pages).
European Patent Office, "European Search Report", issued in connection with European Patent Application No. 12802805.7, dated May 27, 2015 (8 pages).
European Patent Office, "European Search Report", issued in connection with European Patent Application No. 12802746.3, dated May 27, 2015 (9 pages).
Canadian Intellectual Property Office, "Office Action," issued in connection with Canadian Application Serial No. 2,773,567, on Mar. 27, 2015, 5 pages.
United States Patent and Trademark Office, "Final Office Action", issued in connection with U.S. Appl. No. 13/767,548 dated Aug. 11, 2015 (12 pages).
United States Patent and Trademark Office, "Final Office Action", issued in connection with U.S. Appl. No. 13/778,108 dated Aug. 13, 2015 (16 pages).
United States Patent and Trademark Office, "Non-Final Office Action", issued in connection with U.S. Appl. No. 13/443,596, dated Oct. 20, 2015 (23 pages).
United States Patent and Trademark Office, "Non-Final Office Action", issued in connection with U.S. Appl. No. 13/793,991, dated Oct. 22, 2015 (20 pages).
State Intellectual Property Office of China, "Office Action", issued in connection with Chinese Patent Application No. 201280032737.0, dated Nov. 10, 2015 (5 pages).
IP Australia, "Notice of Grant," issued in connection with Application No. 2012272872, Dec. 3, 2015, 1 page.
United States Patent and Trademark Office, "Non-Final Office Action", issued in connection with U.S. Appl. No. 13/778,108, dated Jan. 8, 2016 (44 pages).
United States Patent and Trademark Office, "Final Office Action", issued in connection with U.S. Appl. No. 14/089,279, dated Nov. 17, 2015 (25 pages).
United States Patent and Trademark Office, "Final Office Action", issued in connection with U.S. Appl. No. 13/181,147, dated Dec. 3, 2015 (10 pages).

(56) References Cited

OTHER PUBLICATIONS

United States Patent and Trademark Office, "Notice of Allowance", issued in connection with U.S. Appl. No. 13/767,548, dated Dec. 4, 2015 (9 pages).

United States Patent and Trademark Office, "Non-Final Office Action", issued in connection with U.S. Appl. No. 13/455,961, dated Sep. 24, 2015 (16 pages).

United States Patent and Trademark Office, "Non-Final Office Action", issued in connection with U.S. Appl. No. 13/793,974, dated Sep. 24, 2015 (14 pages).

IP Australia, "Notice of Acceptance", issued in connection with Australian Patent Application No. 2012272872 dated Aug. 6, 2015 (2 pages).

IP Australia, "Notice of Acceptance", issued in connection with Australian Patent Application No. 2012272874, dated Sep. 11, 2015 (2 pages).

Japanese Patent Office, "Notice of Reasons for Rejection", issued in connection with Japanese Patent Application No. P2014-517158, dated Jan. 26, 2016 (4 pages).

Canadian Intellectual Property Office, "Office Action", issued in connection with Canadian Patent Application No. 2,773,567, dated Mar. 9, 2016 (4 pages).

European Patent Office, "Communication Pursuant to Article 94(3) EPS," issued in connection with application No. 12002599.4 on Mar. 4, 2016, (4 pages).

United States Patent and Trademark Office, "Non-Final Office Action", issued in connection with U.S. Appl. No. 13/341,661, dated Feb. 1, 2016 (8 pages).

United States Patent and Trademark Office, "Notice of Allowance" issued in connection with U.S. Appl. No. 13/181,147, dated Feb. 18, 2016 (8 pages).

United States Patent and Trademark Office, "Non-Final Office Action", issued in connection with U.S. Appl. No. 14/922,918, dated Feb. 23, 2016 (17 pages).

United States Patent and Trademark Office, "Final Office Action", issued in connection with U.S. Appl. No. 13/455,961, dated Mar. 23, 2016 (17 pages).

United States Patent and Trademark Office, "Final Office Action", issued in connection with U.S. Appl. No. 13/443,596, dated Apr. 6, 2016 (25 pages).

United States Patent and Trademark Office, "Final Office Action", issued in connection with U.S. Appl. No. 13/793,991, dated Apr. 8, 2016 (23 pages).

\* cited by examiner

US 9,357,261 B2

METHODS AND APPARATUS TO MEASURE EXPOSURE TO STREAMING MEDIA

RELATED APPLICATION

This patent arises from a continuation of U.S. patent application Ser. No. 13/767,548, which was filed on Feb. 14, 2013 and is hereby incorporated herein by reference in its entirety.

FIELD OF THE DISCLOSURE

This disclosure relates generally to measuring media exposure, and, more particularly, to methods and apparatus to measure exposure to streaming media.

BACKGROUND

Internet access to media has become widespread. Media is now frequently streamed to consumers via streaming services such as, Netflix™, Hulu™, and others. Streaming enables media to be delivered to and presented by a wide variety of media presentation devices, such as a digital versatile disc (DVD) player, a smart TV, an Apple TV®, a Roku™ media player, a Boxee™ media player, a Sony PlayStation™, a Microsoft® Xbox®, etc. A significant portion of media (e.g., content and/or advertisements) is presented via streaming to such devices.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
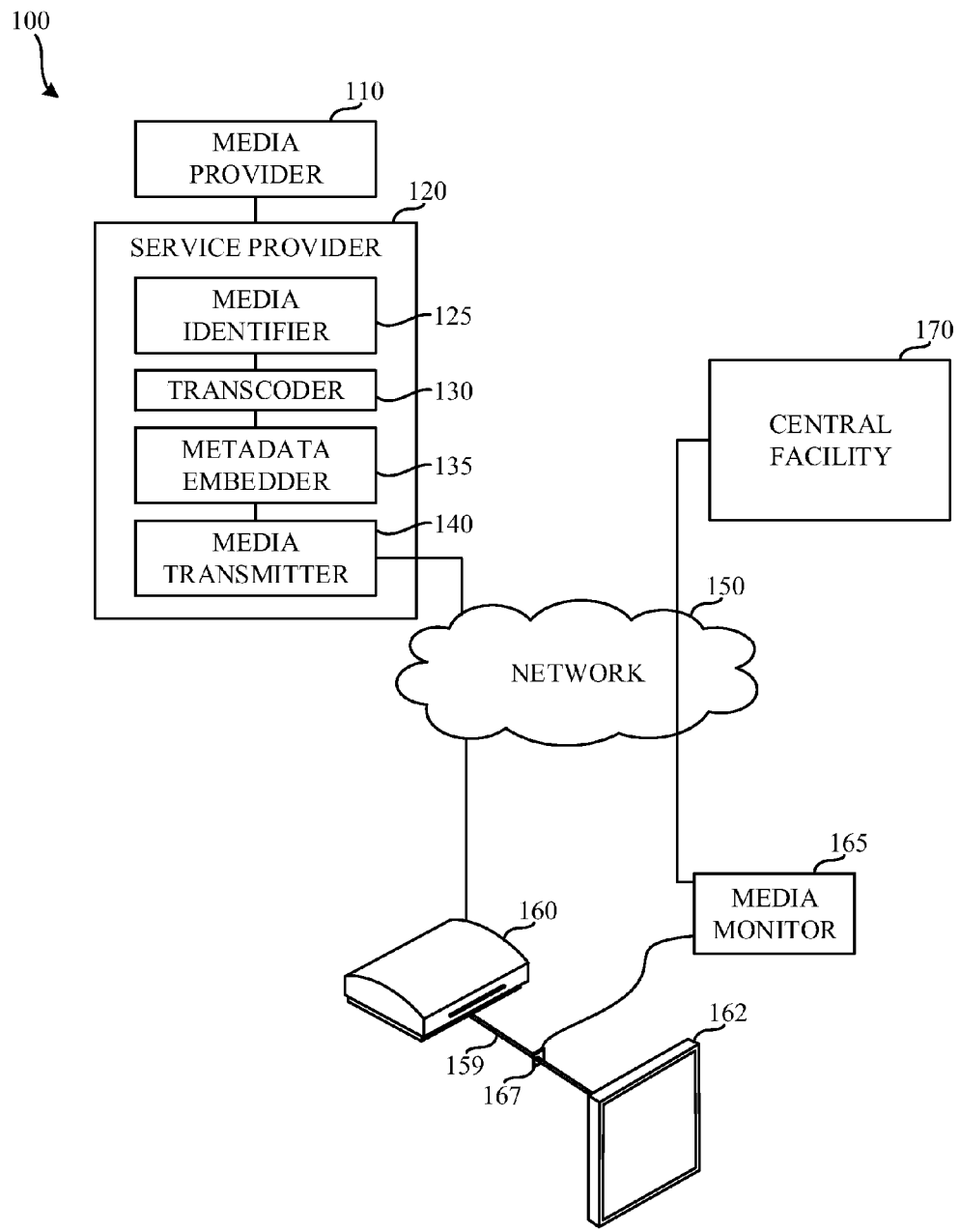
FIG. 1 is a block diagram of an example system constructed in accordance with the teachings of this disclosure for measuring exposure to streaming media.

Example methods, apparatus, systems, and articles of manufacture disclosed herein may be used to measure exposure to streaming media. Some such example methods, apparatus, and/or articles of manufacture measure such exposure based on media metadata, user demographics, and/or media device types. Some examples disclosed herein may be used to monitor streaming media transmissions received at media devices such a DVD player, a Smart TV, an Apple TV®, a Roku™ media player, a Boxee™ media player, a Sony PlayStation™, a Microsoft® Xbox®, and/or any other device capable of playing media. Some example implementations disclosed herein may additionally or alternatively be used to monitor playback transmitted via a high definition media interface (HDMI) interface. Example monitoring processes disclosed herein collect media metadata associated with media presented via media devices and associate the metadata with demographics information of users of the media devices. In this manner, detailed exposure metrics are generated based on collected media metadata and associated user demographics.

The use of media devices (e.g., a DVD player, an Apple TV®, a Roku™ media player, a Boxee™ media player, a Sony PlayStation™, a Microsoft® Xbox®, etc.) to present media via a monitor or television has increased in recent years. Because these media devices are typically controlled using a remote control rather than a mouse and a keyboard, media interfaces are traditionally created for use at a "ten-foot" interface. That is, interfaces on the media devices are typically created to enable users to control a media application from across a room. As different types of media applications (e.g., a Netflix™ application, a Hulu™ application, a Pandora™ application, etc.) for such media devices have been created, the popularity of streaming media has increased. In view of the increasing popularity of accessing media in this manner, understanding how users interact with the streaming media (e.g., such as by understanding what media is presented, how the media is presented, etc.) provides valuable information to service providers, advertisers, content providers, manufacturers, and/or other entities.

To provide streaming media, media is received at a service provider from a media provider such as, for example, a satellite provider, a cable provider, a physical media provider (e.g., a Digital Versatile Disk (DVD)-by-mail service, etc.). The media is intended to be streamed from the service provider to one or more media devices for presentation thereon in response to the request for the same. In the illustrated example, the media is provided to the media devices as a transport stream. In some examples, metering data having a first format is extracted from the transport stream. In some such examples, the transport stream corresponds to a Moving Picture Experts Group (MPEG) 2 transport stream sent according to a hypertext transfer protocol (HTTP) live streaming (HLS) protocol. However, the transport stream may additionally or alternatively correspond to and/or be sent according to any other past, present, or future protocol and/or format such as, for example, MPEG 4, an HTTP Secure protocol (HTTPS), a file transfer protocol (FTP), a secure file transfer protocol (SFTP).

The Twenty-First Century Communications and Video Accessibility Act of 2010 requires, in part, for HDTV-decoding media devices to have an input to enable and/or disable closed captioning in an output signal. The Act also requires that broadcasters provide closed captioning for television programs, even for programs that are distributed via the Internet. When playing the media, the media devices transmit the closed captioning data to a display using a closed captioning data stream such as, for example a Digital Television Closed Captioning (DTVcc) transport stream. In some examples, the media device renders the closed captioning information as an overlay to the media. Nonetheless, the media device is still required to transmit the closed captioning data stream. Besides traditional closed captioning data (e.g., English subtitles, Spanish subtitles, etc.), media-identifying information (e.g., metadata) may be transmitted using the closed captioning transport stream.

Audio watermarking is a technique used to identify media such as television broadcasts, radio broadcasts, downloaded media, streaming media, prepackaged media, etc. Existing audio watermarking techniques identify media by embedding audio codes (e.g., a watermark), such as identifying information, into an audio and/or video component having a signal characteristic sufficient to hide the watermark. As used herein, the terms "code" or "watermark" are used interchangeably and are defined to mean an identifier that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature, and can take the form of a series of digital values, a waveform, etc., representative of the media signal(s), such as the audio and/or video signals, forming the media presentation being monitored. A good signature is usually one that is repeatable when processing the same media presentation, but that is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes may then be associated with the monitored media whose monitored signature matched the reference signature.

In some examples, metadata embedded in the media is in a first format (e.g., a watermark, a signature, a code, etc.). In some examples, the metering data having the first format includes an audio watermark that is embedded in an audio portion of the media. Additionally or alternatively, the metering data having the first format can include a video (e.g., image) watermark that is embedded in a video portion of the media. Many media devices do not have access to the metadata in the first format, and/or in some cases, enough processing power to identify the metadata in the first format. Thus, in examples disclosed herein, the service provider identifies the watermark, and converts the metadata into a second format readable by the media device. The metadata in the second format may correspond to, for example, metadata represented in a text format, such as a text format for inclusion in a timed text track file sent in association with the streaming media.

A timed text track is a document and/or file that is linked to, transmitted with, and/or embedded in an object (e.g., a webpage, a flash player, etc.) that causes display of media. The timed text track defines times for displaying text (e.g., closed captioning, subtitles, comments, advertisements, metadata, etc.) at corresponding places and/or times associated with the presentation of the media. For example, the timed text track may specify that the phrase "This is a patentable invention" should be displayed at time 00:01:12 after the start of the media presentation should the closed captioning option be utilized by the displaying device (e.g., a television, etc.). In examples illustrated herein, the timed text track is provided to the media device in association with the media. In the illustrated example, the timed text track is requested separately from the media based on a source attribute of a timed text track tag. Thus, the timed text track is associated with the media, but not bodily incorporated therein. However, in some examples, the information of the timed text track is included in the media (e.g., within an MPEG2 transport stream).

Figure 10:
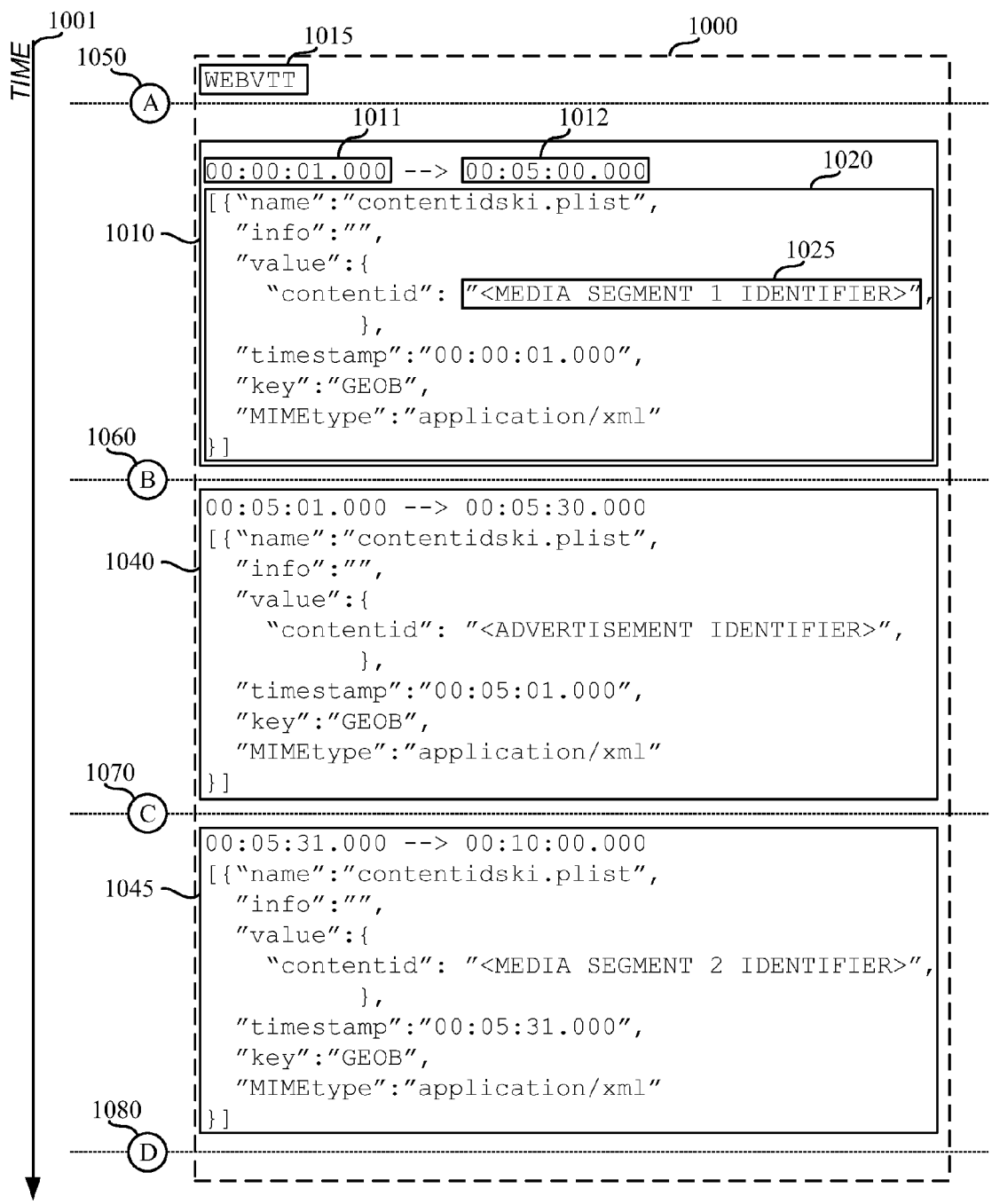
FIG. 10 illustrates example timed text track code representing an example timed text track that may be used by the example media monitor of FIGS. 1 and/or 2.

The timed text track document includes start cues, end cues, and data associated with those cues. The start cues and end cues define times in the associated media that trigger an event associated with the timed text track. In some examples, the timed text track document is used to cause the display of subtitles and/or captioning data defined in the data associated with the cues. Upon reaching a start cue, the subtitles and/or captioning data are displayed. Upon reaching an end cue, the subtitles and/or captioning data are removed from display. An example timed text track file is shown in FIG. 10 and discussed further below.

In some disclosed examples, streaming media is delivered to the media device using HTTP Live Streaming (HLS). However, any other past, present, and/or future protocol(s) and/or method(s) of streaming media to the media device may additionally or alternatively be used such as, for example, an HTTP Secure (HTTPS) protocol, a custom application, etc. Additionally or alternatively, any other past, present, and/or future web page language may additionally or alternatively be used. The HyperText Markup Language version 5 (HTML5) allows metadata to be included in a timed text track and/or otherwise associated with, for example, a media stream, etc. In some disclosed examples, a media device uses an application to display media received via HLS. Additionally or alternatively, in some disclosed examples the media device uses a media presenter (e.g., a browser plugin, an app, a framework, an application programming interface (API), etc.) to display media received via HLS.

In some examples illustrated herein, the media device requests the web page from a service provider. In some examples illustrated herein, the webpage defines a timed text track document that is to be separately requested by the media device. In some examples, the timed text track document is hosted by the service provider. However, in other examples, the timed text track document is hosted by an entity other than the service provider such as, for example, the central facility of the audience measurement entity, etc. In some examples, the timed text track is included in the web page such that no additional request is needed to access the timed text track document.

In examples illustrated below, media exposure metrics are monitored by identifying metadata transmitted from the media device to a display (e.g., a television.) In some such examples, the media device transmits metadata received via the timed text track as part of an MPEG2 stream transmitted to the display.

Example methods, apparatus, systems, and articles of manufacture disclosed herein involve intercepting or collecting metadata (e.g., metadata stored in an ID3 tag, extensible markup language (XML) based metadata, and/or metadata in any other past, present, and/or future format) associated with streaming media transmissions (e.g., streaming audio and/or video) between the media device and the display (e.g., a TV or monitor). In some examples, the metadata identifies one or more of a genre, an artist, a song title, an album name, a transmitting station/server site, etc. In such examples, highly granular (e.g., very detailed) data can be collected. Whereas in the past ratings were largely tied to specific programs or broadcasting stations, example methods, apparatus, systems, and/or articles of manufacture disclosed herein can generate ratings for a genre, an artist, a song, an album/CD, a particular transmitting/server site, etc. in addition to, or as an alternative to, generating ratings for specific programs (e.g., radio, television, etc.), advertisements, content providers, broadcasters, and/or stations.

In some examples, metadata collection may be implemented by monitoring a closed captioning transport stream within an MPEG2 transport stream being transmitted from the media device to the display. In examples disclosed herein, metadata is continually monitored (e.g., polled and/or collected). However, the metadata may be monitored for a change in the transmitted metadata and/or only collected when a change is detected. In some examples, the collected metadata is time stamped based on its time of collection.

Example methods, apparatus, systems, and articles of manufacture disclosed herein collect demographic information associated with users of media devices based on identifiers (e.g., an Internet protocol (IP) address, a cookie, a device identifier, etc.) associated with those media devices. Media exposure information may then be generated based on the media metadata and the user demographics corresponding to the identifier to indicate exposure metrics and/or demographic reach metrics for any or all of the media, a genre, an artist, an album name, a transmitting station/server site, etc.

To link demographics to the monitoring information, the audience measurement entity establishes a panel of users who have agreed to provide their demographic information and to have their streaming media activities monitored. When an individual joins the panel, they provide detailed information concerning their identity and demographics (e.g., gender, race, income, home location, occupation, etc.) to the audience measurement entity. In some examples, the audience measurement entity sends (e.g., via postal mail) a media monitor to be configured intermediate a media device and a display (e.g., a television). In particular, the media monitor provided to each panelist reports access(es) to streamed media in substantially real time to a central facility of the audience measurement entity. In some examples, the media monitor reports access(es) to streamed media as the access(es) occur (e.g., streaming). In some examples, the media monitor caches (e.g., stores, buffers, etc.) the access(es) to streamed media and transmits the cached access(es) to the central facility.

Example methods, apparatus, systems, and articles of manufacture disclosed herein may also be used to generate reports indicative of media exposure metrics on one or more different types of media devices (e.g., a Smart TV, a DVD player, an Apple TV®, a Roku™ media player, a Boxee™ media player, a Sony PlayStation™, Microsoft® Xbox®, etc.). For example, an audience measurement entity may generate media exposure metrics based on metadata extracted from the streaming media at the media device and/or similar devices. A report is then generated based on the media exposure to indicate exposure measurements (e.g., for a type of media (e.g., a genre)) using different types of media devices. Thus, for example, reports indicating the popularity of watching, for instance, sports events on certain types of media devices (e.g., streaming devices) can be compared to other popularities of watching sports events on other types of media devices (e.g., televisions that are not enabled for streaming).

Additionally or alternatively, popularities of different types of media across different device types may be compared. Such different types of media may be, for example, news, movies, television programming, on-demand media, Internet-based media, games, streaming games, etc. Such comparisons may be made across any type(s) and/or numbers of devices including, for example, cell phones, smart phones, dedicated portable multimedia playback devices, iPod® devices, tablet computing devices (e.g., an iPad®, etc.), standard-definition (SD) televisions, high-definition (HD) televisions, three-dimensional (3D) televisions, stationary computers, portable computers, Internet radios, etc. Any other type(s) and/or number of media and/or devices may be analyzed. The report may also associate the media exposure metrics with demographic segments (e.g., age groups, genders, ethnicities, etc.) corresponding to the user(s) of the media device(s). Additionally or alternatively, the report may include metric indicators of popularity of artist, genre, song, title, etc., across one or more user characteristics selected from one or more demographic segment(s), one or more age group(s), one or more gender(s), and/or any other user characteristic(s).

In some examples, the media exposure metrics are used to determine demographic reach of streaming media, ratings for streaming media, engagement indices for streaming media, user affinities associated with streaming media, broadcast media, and/or any other audience measure metric associated with streaming media, one or more aspects and/or components of streaming media (e.g., an actor's name). In some examples, the media exposure metrics are audience share metrics indicative of percentages of audiences for different device types that accessed the same media. For example, the metrics may indicate a first percentage of an audience may be exposed to news media via smart phones, while a second percentage of the audience may be exposed to the same news media via tablets.

FIG. 1 is a block diagram of an example system 100 constructed in accordance with the teachings of this disclosure for measuring exposure to streaming media. The example system 100 of FIG. 1 monitors media provided by an example media provider 110 for presentation on an example media device 160 via an example network 150. The example of FIG. 1 includes an example service provider 120, an example media monitor 165, and an example central facility 170 of an audience measurement entity. While the illustrated example of FIG. 1 discloses an example implementation of the service provider 120, other example implementations of the service provider 120 may additionally or alternatively be used, such as the example implementations disclosed in U.S. patent application Ser. No. 13/341,646, which is hereby incorporated by reference herein in its entirety.

The media provider 110 of the illustrated example of FIG. 1 corresponds to any one or more media provider(s) capable of providing media for presentation via the media device 160. The media provided by the media provider(s) 110 can provide any type of media, such as audio, video, multimedia, etc. Additionally, the media can correspond to live media, streaming media, broadcast media, stored media, on-demand content, etc.

The service provider 120 of the illustrated example of FIG. 1 provides media services to the media device 160 via, for example, web pages including links (e.g., hyperlinks, embedded media, etc.) to media provided by the media provider 110. In the illustrated example, the service provider 120 modifies the media provided by the media provider 110 prior to transmitting the media to the media device 160. In the illustrated example, the service provider 120 includes an example media identifier 125, an example transcoder 130, an example metadata embedder 135, and an example media transmitter 140.

The media identifier 125 of the illustrated example of FIG. 1 is implemented by a logic circuit such as a processor executing instructions, but it could additionally or alternatively be implemented by an application specific integrated circuit(s) (ASIC(s)), programmable logic device(s) (PLD(s)) and/or field programmable logic device(s) (FPLD(s)), an analog circuit, and/or other circuitry. The media identifier 125 of FIG. 1 extracts metering data (e.g., signatures, watermarks, etc.) from the media obtained from the media provider 110. For example, the media identifier 125 can implement functionality provided by a software development kit (SDK) to extract one or more audio watermarks, one or more video (e.g., image) watermarks, etc., embedded in the audio and/or video of the media obtained from the media provider 110. (For example, the media may include pulse code modulation (PCM) audio data or other types of audio data, uncompressed video/image data, etc.)

The example media identifier 125 of FIG. 1 determines (e.g., derives, decodes, converts, etc.) the metering data (e.g., such as media identifying information, source identifying information, etc.) included in or identified by a watermark embedded in, associated with, and or transmitted with the media, and converts this metering data and/or the watermark itself into a text and/or binary format for inclusion in an ID3 tag and/or other data type (e.g., text, binary, etc.) for insertion as metadata in a timed text track associated with the streaming media. For example, the code/watermark itself may be extracted and inserted as metadata in, for example, a text or binary format in the ID3 tag. Thus, the metadata and/or media-identifying metadata included in the ID3 tag may be a text or binary representation of a code, a watermark, and/or metadata or data identified by a code and/or watermark, etc.

The example transcoder 130 of the illustrated example of FIG. 1 is implemented by a logic circuit such as a processor executing instructions, but could additionally or alternatively be implemented by any other logic circuit, ASIC, DSP, FPGA, and/or other analog and/or digital circuitry. In some examples, the transcoder 130 and the media identifier 125 are implemented by the same physical processor. In the illustrated example, the transcoder 130 employs any appropriate technique(s) to transcode and/or otherwise process the received media into a form suitable for streaming (e.g., a streaming format). For example, the transcoder 130 of the illustrated example transcodes the media in accordance with MPEG 2 audio/video compression for use via the HLS protocol.

The metadata embedder 135 of the illustrated example of FIG. 1 is implemented by a logic circuit such as a processor executing instructions, but could additionally and/or alternatively be implemented by any other logic circuit, ASIC, DSP, FPGA, and/or other analog and/or digital circuitry. In some examples, the transcoder 130, the media identifier 125, and the metadata embedder 135 are implemented by the same physical processor.

In the illustrated example, the metadata embedder 135 embeds the metadata determined by the media identifier 125 into a timed text track document. In some examples the metadata is embedded into a closed captioning transport stream of the media. In the illustrated example, the timed text track is in a Web Video Text Track (WebVTT) format. However, any other past, present, and/or future format such as, for example, a Timed Text Markup Language (TTML), SubViewer (SUB), Subtitle resource tracks (SRT), Web Subtitle Resource Tracks (WebSRT), SubRip, Distribution Exchange Profile (DFXP), W3C Timed Text Format, Timed Test Exchange Profile, Extensible Markup Language (XML), Captionate XML, Synchronized Accessible Media Interchange (SAMI), Consumer Electronics Association (CEA) standard 608, CEA standard 708, teletext, and/or Line 21 format may additionally or alternatively be used. In some examples, the metadata embedder 135 inserts ID3 tag metadata corresponding to the metering metadata into the timed text track document to identify particular events within the media such as, for example, when an advertisement is displayed via product placement, when a dedicated advertisement is displayed, when a particular event occurs within the media (e.g., when a contestant on a television game show answers a question, when a televised movie returns from an advertisement, etc.), etc. Additionally or alternatively, the metadata embedder 135 may embed the metadata into a separate metadata document, such as by encoding the metadata into an M3U8 or other data file that is to be associated with (e.g., included in, appended to, sent prior to, etc.) the media.

The media transmitter 140 of the illustrated example of FIG. 1 is implemented by a logic circuit such as a processor executing instructions, but could additionally or alternatively be implemented by any other circuit, ASIC, DSP, FPGA, and/or other analog and/or digital circuitry. In some examples, the transcoder 130, the media identifier 125, the metadata embedder 135, and the media transmitter 140 are implemented by the same physical processor.

The media transmitter 140 employs any appropriate technique(s) to select and/or stream the media to a requesting device, such as the media device 160. For example, the media transmitter 140 of the illustrated example selects media that has been identified by the media identifier 125, transcoded by the transcoder 130 and undergone metadata embedding by the metadata embedder 135. The media transmitter 140 then streams the media to the media device 160 via the network 150 using HLS or any other streaming protocol such as, for example, Media Player version 4 (MP4), Adobe Flash (FLV), Moving Picture Experts Group (MPEG) version 2 (MPEG2), MPEG version 4 (MPEG4), etc.

In some examples, the media identifier 125, the transcoder 130, and/or the metadata embedder 130 prepare media for streaming regardless of whether (e.g., prior to) a request is received from the media device 160. In such examples, the already-prepared media is stored in a data store of the service provider 120 (e.g., such as in a flash memory, magnetic media, optical media, etc.). In such examples, the media transmitter 140 prepares a transport stream for streaming the already-prepared media to the media device 160 when a request is received from the media device 160. In other examples, the media identifier 125, the transcoder 130, and/or the metadata embedder 130 prepare the media for streaming in response to a request received from the media device 160.

The network 150 of the illustrated example is the Internet. Additionally or alternatively, any other network(s) communicatively linking the service provider 120 and the media device such as, for example, a private network, a local area network (LAN), a virtual private network (VPN), etc. may be used. The network 150 may comprise any number of public and/or private networks using any type(s) of networking protocol(s).

Figure 2:
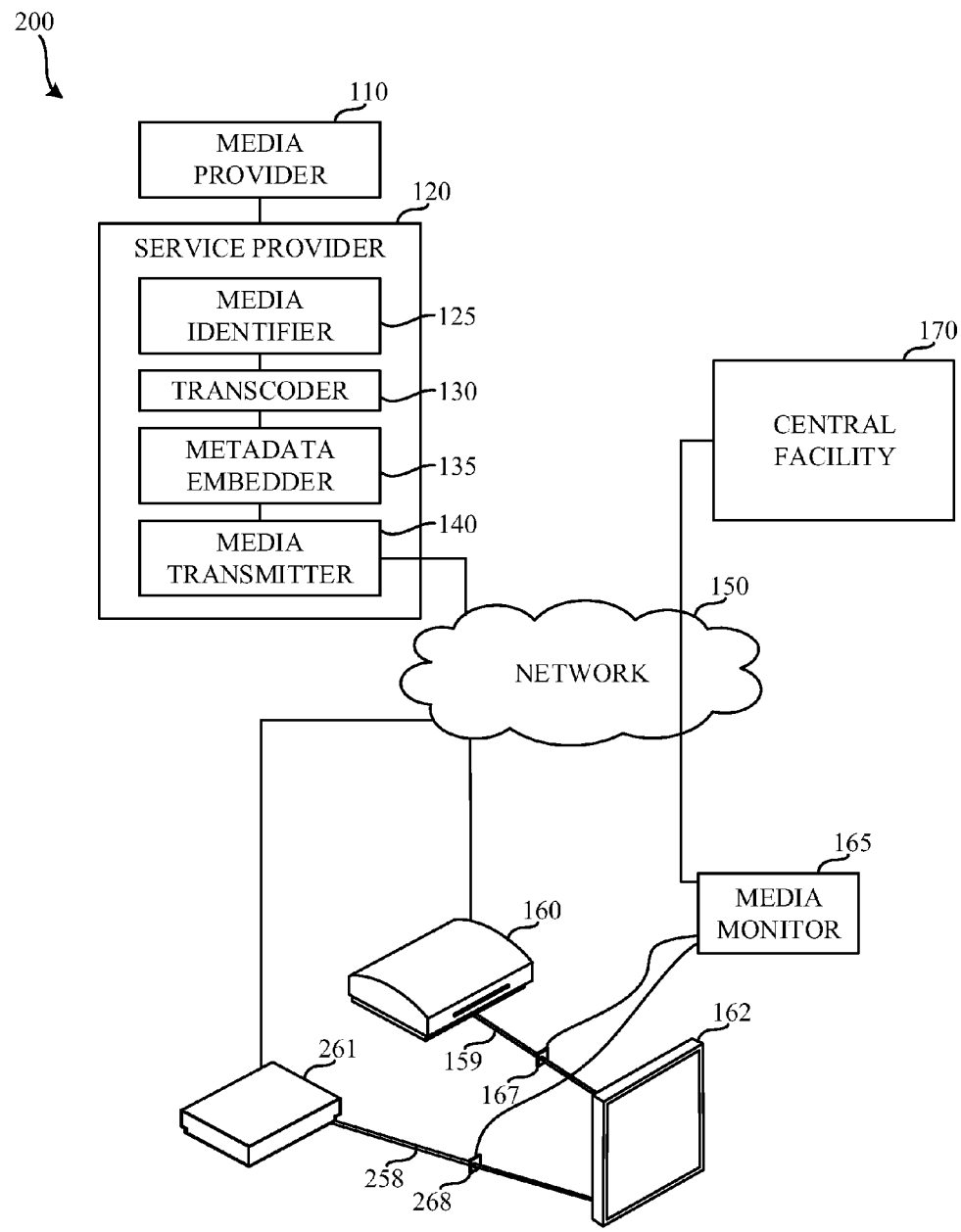
FIG. 2 is a diagram of an example alternate system for measuring exposure to streaming media presented using multiple media devices.

The media device 160 of the illustrated example of FIG. 1 is a computing device that is capable of presenting streaming media provided by the media transmitter 140 via the network 150. The media device 160 may be, for example, a DVD player, an Apple TV®, a Roku™ media player, a Boxee™ media player, a Sony PlayStation™, Microsoft® Xbox®, etc. In the illustrated example, the media device 160 outputs media via an HDMI interface 159 (e.g., an HDMI cable). However, any other type and/or format of interface may additionally or alternatively be used. In some examples, multiple HDMI interfaces and/or cables may be used. For example, and audio/video receiver may include multiple HDMI outputs. While a single media device 160 is illustrated, any number and/or type(s) of media devices may be used. For example, FIG. 2 shows an example system where multiple media devices are used.

In the illustrated example, the media device 160 outputs media including closed captioning data. In some examples, the closed captioning data is received as part of the media (e.g., embedded in an MPEG2 transport stream). However, in some examples, the closed captioning data and/or metadata is received separately from the media (e.g., the closed captioning data and/or metadata is received via a timed text track). When the closed captioning data and/or metadata is received separately from the media, the media device 160 multiplexes the closed captioning data and/or metadata into the media (e.g., into the MPEG2 transport stream) prior to sending the media to the display 162. In some examples, the user is able to select whether the closed captioning data and/or metadata is displayed by the display 162. In some examples, the user makes such selection at the display. In such a scenario, the closed captioning data and/or metadata is sent to the display, where the display renders the selected closed captioning data and/or metadata as an overlay to the media. In some examples, the user makes the selection at the media device 160. In such examples, the media device may render the closed captioning data and/or metadata as an overlay to the media. Regardless of when the selection is entered, the media device 160 outputs the closed captioning data and/or metadata to the display 162.

The display 162 of the illustrated example of FIG. 1 is a display device that is capable of displaying media received from the media device 160. In the illustrated example, the display 162 is a television. However, any other type of display may additionally or alternatively be used such as, for example, a three dimensional television, a high-definition television, a computer monitor, etc.

In the illustrated example, the media monitor 165 intercepts HDMI data transmitted from the media device 160 to the display 162 via the HDMI cable 159. An example implementation of the media monitor 165 is described in further detail in connection with FIG. 3. The example media monitor 165 of FIG. 1 includes a media interceptor 167. The media interceptor 167 of the illustrated example functions as an HDMI tap in that it allows the media monitor 165 to intercept the HDMI data. The HDMI data is passed through the media interceptor 167, such that the display 162 displays media as if the media interceptor 167 were not present. In the illustrated example of FIG. 1, the media interceptor 167 is separate from the media monitor 165. The media interceptor 167 transmits the HDMI data to the media monitor 165 of FIG. 1 via a wire. However, the media interceptor 167 may transmit the data to the media monitor 165 in any other fashion such as, for example, wirelessly. The example media monitor 165 inspects the HDMI data to identify media-identifying metadata. The metadata is transmitted from the example media monitor 165 to the central facility 170 for analysis.

In the illustrated example, the media interceptor 167 is separate from the media monitor 165. The media interceptor 167 is located electrically between the media device 160 and the display 162. That is, a cable (e.g., an HDMI cable) which would traditionally extend from the media device 160 to the display 162, is instead routed from the media device 160 to the media interceptor 167. A second cable is then routed from the media interceptor 167 to the display 162. In other words, the media interceptor 167 is to intercept a media stream intermediate a media device and a display. In some examples, the media interceptor 167 may be referred to as being 'in-line' with the electric connection (e.g., an HDMI cable) between the media device 160 and the display 162. In addition, when the media interceptor 167 is implemented separately from the media monitor 165, the media interceptor 167 splits information transmitted by the media device 160 and sends the information to both the display 162 and the media monitor 165. In the illustrated example, the media interceptor 167 transmits data to the media monitor 165 via an HDMI cable. However, any other type(s) and/or format(s) of data interface may additionally or alternatively be used.

In the illustrated example, the media monitor 165 is implemented separate from the display 162. However, in some examples, the media monitor 165 may be implemented as a part and/or component of the display. That is, the display 162 may be sold with the media monitor 165 included and/or as an available attachment. In some examples, the media monitor 165 is located inside a housing of the display. When the media monitor 165 is located inside the housing of the display, the HDMI ports mentioned herein may be replaced with internal data lines (e.g., a bus) to receive and/or intercept HDMI data.

The central facility 170 of the illustrated example is a facility of an audience measurement entity (e.g., the Nielsen Company (US) LLC) and includes an interface to receive reported metering information (e.g., metadata) from the media monitor 165 via the network 150. In the illustrated example, the central facility 170 includes an HTTP interface to receive HTTP requests that include the metering information. The HTTP requests are sent with the metering information in their payload. The requests may not be intended to actually retrieve content, but are instead used as a vehicle to convey the metering information. Thus, the requests may be referred to dummy requests in that they are not actually intended to request any content. The central facility 170 is provided with software (e.g., a daemon) to extract the metering information from the payload of the dummy request(s). Additionally or alternatively, any other method(s) to transfer the metering information may be used such as, for example, an HTTP Secure protocol (HTTPS), a file transfer protocol (FTP), a secure file transfer protocol (SFTP), an HTTP and/or HTTPS GET request, an HTTP and/or HTTPS POST request, etc. In the illustrated example, the central facility 170 stores and analyzes the extracted metering information received from a plurality of different media devices. For example, the central facility 170 may sort and/or group metering information by media provider 110 (e.g., by grouping all metering data associated with a particular media provider 110). Any other processing of metering information may additionally or alternatively be performed. In some examples, the central facility 170 adds a timestamp to the metadata upon receipt. Timestamping (e.g., recording a time that an event occurred) enables accurate identification and/or correlation of media that was presented and/or the time that it was presented with the user(s) of the presentation device.

FIG. 2 is a block diagram of an example system 200 constructed in accordance with the teachings of this disclosure for measuring exposure to streaming media presented using multiple media devices. The example system of FIG. 2 includes many of the same or similar components as the example system of FIG. 1. Those similar components are not described herein. Instead, like components are labeled with identical reference numerals so that the interested reader may refer back to the above description for a full description of those elements of FIG. 2. The example system of FIG. 2 includes an alternate media device 261. The alternate media device 261 of the illustrated example is implemented as a set top box. However, any other type of media device may additionally or alternatively be used such, for example, an Apple TV®, a Roku™ media player, a Boxee™ media player, a Sony PlayStation™, Microsoft® Xbox®, etc. In the illustrated example, the alternate media device 261 outputs media via an HDMI interface such as an HDMI cable 258. However, any other type and/or format of interface and/or cable may additionally or alternatively be used.

The example system 200 of FIG. 2 includes a second media interceptor 268. The second media interceptor 268 of the illustrated example functions as an HDMI tap in that it allows the media monitor 165 to intercept the HDMI data transmitted from the alternate media device 261 to the display 162. In the illustrated example of FIG. 1, the second media interceptor 268 is separate from the media monitor 165. The second media interceptor 268 transmits the HDMI data to the media monitor 165 via a wire. However, the second media interceptor 268 may transmit the data to the media monitor 165 in any other fashion such as, for example, wirelessly.

Figure 3:
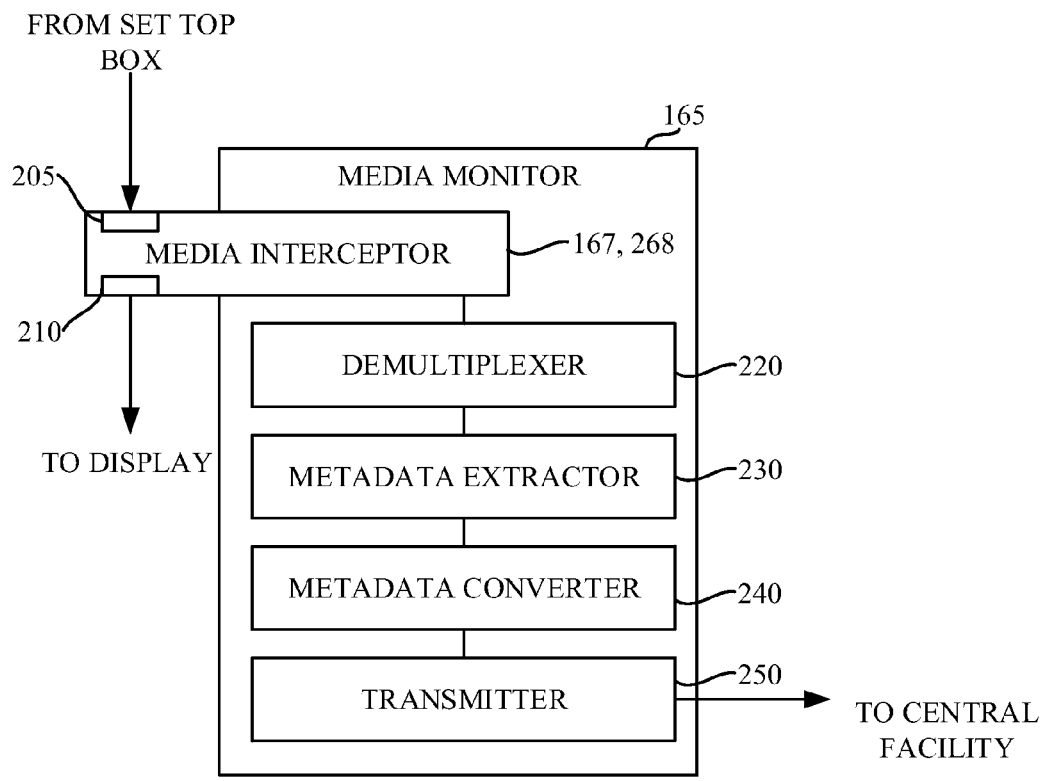
FIG. 3 is a block diagram of an example implementation of the example media monitor of FIGS. 1 and/or 2.

FIG. 3 is a block diagram of an example implementation of the media monitor 165 of FIGS. 1 and/or 2. The media monitor 165 of the illustrated example of FIG. 3 includes the example media interceptor 167, 268, an example demultiplexer 220, an example metadata extractor 230, an example metadata converter 240, and an example transmitter 250. In the illustrated example of FIG. 3, the media interceptor 167, 268 is represented as being partially inside the media monitor 165 and partially outside the media monitor 165. This internal/external depiction is meant to represent that the media interceptor may be implemented external to the media monitor 165 (as described in FIGS. 1 and/or 2), but that the media interceptor 167, 268 may additionally or alternatively be implemented internal to the media monitor 165.

The example media interceptor 167, 268 of the illustrated example of FIG. 3 is implemented by one or more HDMI ports. The example media interceptor 167, 268 intercepts media transmitted from the media device 160 to the display 162 via HDMI. In the illustrated example, the media interceptor 167, 268 includes a first port 205 (e.g., an input port) to receive media transmitted from the media device 160. The example media interceptor 167, 268 includes a second port 210 (e.g., an output port) to transmit the media received via the first port to the display 162. In the illustrated example of FIG. 3, the media interceptor 167, 268 is depicted as both internal and external to the media monitor 165. As mentioned above and described in connection with FIGS. 4-7, a number of different configurations of the media interceptor 167, 268 may be used. For example, the media interceptor 167, 268 may be external to the media monitor and transmit data to the media monitor 165. That is, the media interceptor 167, 268 may be thought of as an in-line interceptor. In some examples, multiple media interceptors 167, 268 may be used to, for example, monitor multiple media devices. In some other examples, the media interceptor 167, 268 may be implemented as an internal component of the media monitor 165. The media interceptor 167, 268 intercepts HDMI data and forwards the same to the example demultiplexer 220.

The example demultiplexer 220 of the illustrated example of FIG. 3 is implemented by a logic circuit such as a processor executing instructions, but it could additionally or alternatively be implemented by any other logic circuit, an ASIC, DSP, FPGA, and/or other analog and/or digital circuitry. In the illustrated example, the example demultiplexer 220 demultiplexes an MPEG2 stream from the HDMI data. However, the demultiplexer 220 may demultiplex any other format from the HDMI data. Furthermore, the demultiplexer 220 demultiplexes a closed captioning transport stream from the MPEG2 stream. From the closed captioning transport stream, the demultiplexer 220 extracts captioning data. The captioning data is transmitted to the metadata extractor 230.

The metadata extractor 230 of the illustrated example of FIG. 3 is implemented by a logic circuit such as a processor executing instructions, but it could additionally or alternatively be implemented by any other logic circuit, an ASIC, DSP, FPGA, and/or other analog and/or digital circuitry. In some examples, the demultiplexer 220 and the metadata retriever 230 are implemented by the same physical processor. In the illustrated example, the metadata extractor 230 receives closed captioning data from the demultiplexer 220. The metadata extractor 230 parses the closed captioning data to identify metadata contained therein.

The example metadata converter 240 of FIG. 3 is implemented by a logic circuit such as a processor executing instructions, but it could additionally or alternatively be implemented by any other logic circuit, an ASIC, DSP, FPGA, and/or other analog and/or digital circuitry. In some examples, the demultiplexer 220, the metadata extractor 230, and the metadata converter 240 are implemented by the same physical processor. In the illustrated example, the metadata converter 240 converts the metadata extracted by the metadata extractor 230 into a converted metadata format for transmission to the central facility 170. For example, the metadata converter 240 may encrypt, decrypt, compress, modify, etc., the metadata and/or portions of the metadata to, for example, reduce the amount of data to be transmitted to the central facility 170. In the illustrated example, the metadata converter 240 adds a timestamp to the metadata prior to converting the metadata. Timestamping (e.g., recording a time that an event occurred) enables accurate identification and/or correlation of media that was presented with the user(s) of the presentation device present at the corresponding time(s).

The transmitter 250 of the illustrated example of FIG. 3 is implemented by a logic circuit such as a processor executing instructions, but it could additionally or alternatively be implemented by any other logic circuit, an ASIC, DSP, FPGA, and/or other analog and/or digital circuitry. In some examples, the demultiplexer 220, the metadata extractor 230, the metadata converter 240, and the transmitter 250 are implemented by the same physical processor. In the illustrated example, the transmitter 250 transmits the converted metadata to the central facility 170 via, for example, the Internet. While the converted metadata is transmitted in substantially real-time in the illustrated example, in some examples, the converted metadata is stored, cached, and/or buffered before being transmitted to the central facility 170. Additionally or alternatively, the transmitter 250 may transmit an identifier of the media monitor 165 and/or the media device 160 to enable the central facility 170 to correlate the metadata with a panelist, a group of panelists, demographic(s), etc. In some examples, a separate people meter is used to identify persons in the local audience of the monitored device. An example people meter is disclosed in U.S. Pat. No. 7,609,853, which is hereby incorporated by reference in its entirety. In the illustrated example, the central facility 170 is associated with an audience measurement company and is not involved with the delivery of media to the media device. In some examples, the central facility 170 applies a timestamp upon receipt of the converted metadata.

Figure 4:
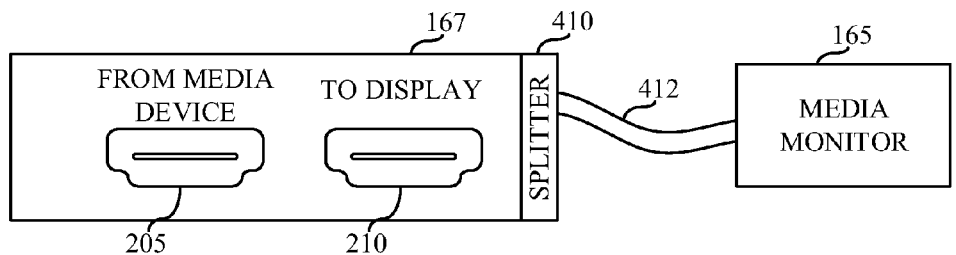
FIG. 4 is a block diagram of an example implementation of the example media monitor of FIGS. 1 and/or 2 including an example media interceptor separate from the media monitor.

FIG. 4 is a block diagram of an example implementation of the media monitor of FIG. 1 including a media interceptor 167 separate from the media monitor 165. In the illustrated example, the media interceptor 167 includes a first port 205 (e.g., an input port) to receive media transmitted from the media device 160. The example media interceptor 167 includes a second port 210 (e.g., an output port) to transmit the media received via the first port to the display 162. The example media interceptor 167 includes a splitter 410. In the illustrated example, the first port 205 and the second port 210 are HDMI ports. However, any other type(s) of port(s) may additionally or alternatively be used such as, for example, a Video Graphics Array (VGA) port, a Digital Video Interface (DVI) port, a display port, a thunderbolt port, a mini HDMI port, a universal serial bus (USB) port, etc. The example splitter 410 of FIG. 4 transmits HDMI data received from the media device 160 to the display 162 and to the media monitor 165. In the illustrated example, the HDMI data is transmitted to the media monitor 165 via a cable 412. In the illustrated example, the cable 412 is an HDMI interface. However, any other type of interface and/or cable may additionally or alternatively be used.

Figure 5:
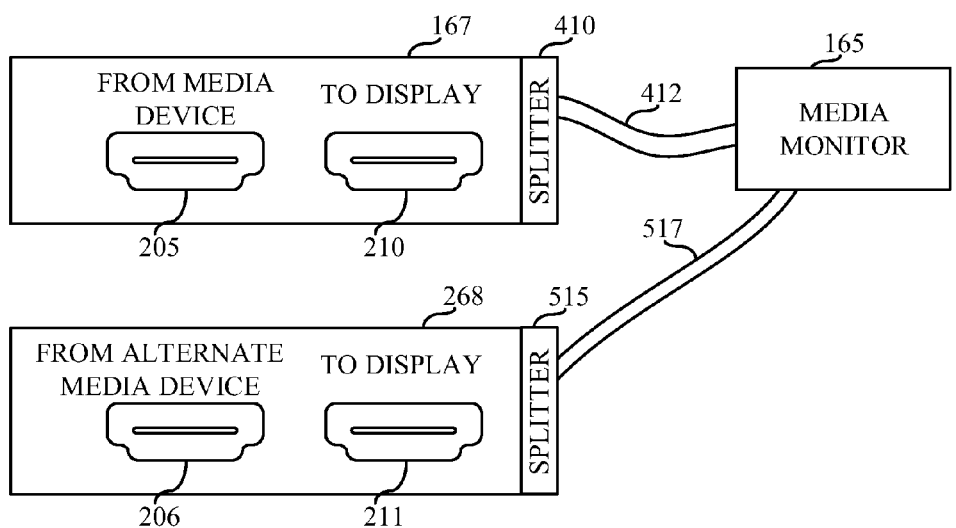
FIG. 5 is a block diagram of an example implementation of the example media monitor of FIGS. 1 and/or 2 including multiple media interceptors separate from the media monitor.

FIG. 5 is a block diagram of an example implementation of the media monitor of FIG. 2 including multiple media interceptors 167, 268 separate from the media monitor 165. Similar to the media interceptor 167 of FIG. 4, the media interceptors 167, 268 of FIG. 5 transmit HDMI data being transmitted to the display 162. In the illustrated example, the second media interceptor 268 includes a first port 206 (e.g., an input port) to receive media transmitted from the alternate media device 161. The example second media interceptor 268 includes a second port 211 (e.g., an output port) to transmit the media received via the first port to the display 162. The example second media interceptor 268 includes a splitter 515.

In the illustrated example, the splitter 515 transmits HDMI data received via the first port 206 to the second port 211 and to the media monitor 165. HDMI data is transmitted to the media monitor 165 via a cable 517. In the illustrated example, the cable 517 is an HDMI interface. However, any other type of interface and/or cable may additionally or alternatively be used. In the illustrated example, the second port 211 of the second media interceptor 268 transmits HDMI data to the same display (e.g., the display 162) as the second port 210 of the first media interceptor 167. However, in some examples, the second port of the second media interceptor 268 transmits HDMI data to a second display different from the display 162. Accordingly, the media monitor 165 may monitor media presentations occurring on multiple displays. In the illustrated example, the first media interceptor 167 intercepts HDMI data being transmitted from the media device 160 to the display 162. The second media interceptor 268 intercepts HDMI data being transmitted from the alternate media device 161 to the display 162. Accordingly, the media monitor 165 is able to identify which media device (e.g., the media device 160 or the alternate media device 161) is transmitting HDMI data to the display 162.

Figure 6:
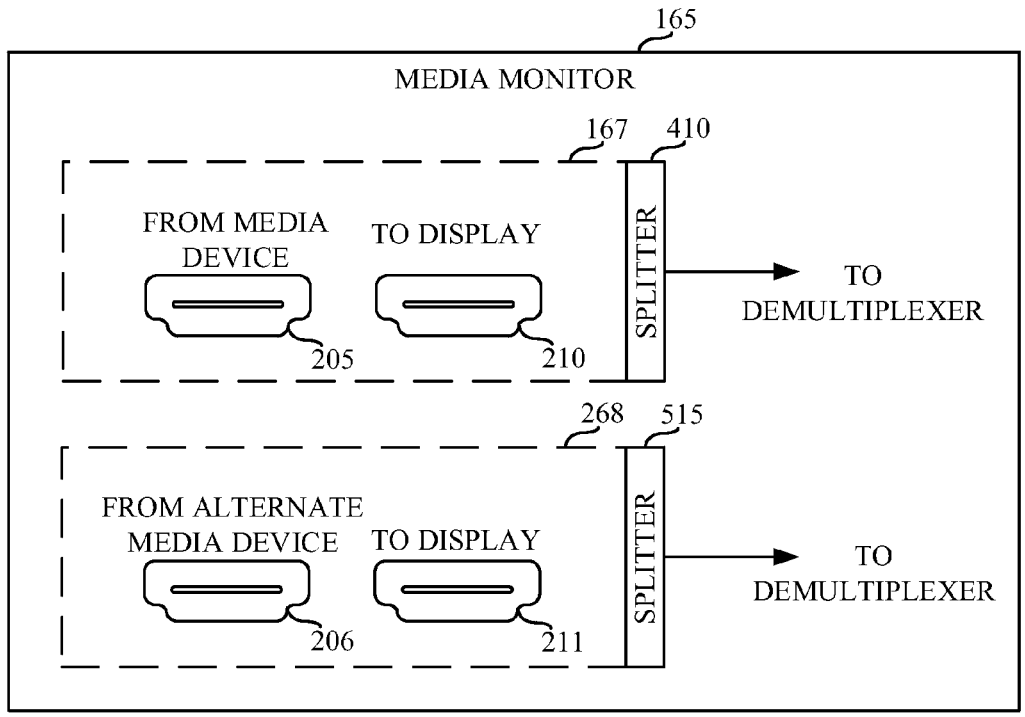
FIG. 6 is a block diagram of an example implementation of the example media monitor of FIGS. 1 and/or 2 including multiple media interceptors internal to the media monitor and multiple corresponding output ports.

FIG. 6 is a block diagram of an example implementation of the media monitor 165 of FIGS. 1 and/or 2 including multiple media interceptors 167, 268 internal to the media monitor 165. The media monitor 165 of FIG. 6 functions in a similar manner to the media monitor 165 of FIG. 5. That is, the example first media interceptor 167 includes a splitter 410 that receives HDMI data from the media device 160 via the first port 205. The example splitter 410 transmits the HDMI data to the demultiplexer 220. The example splitter 410 transmits HDMI data to the display 162 via the second port 210. The second example media interceptor 268 includes a splitter 515 that receives HDMI data from the alternate media device 161 via the first port 206. The example splitter 515 transmits the HDMI data to the display 162 via the second port 211, and to the demultiplexer 220.

Figure 7:
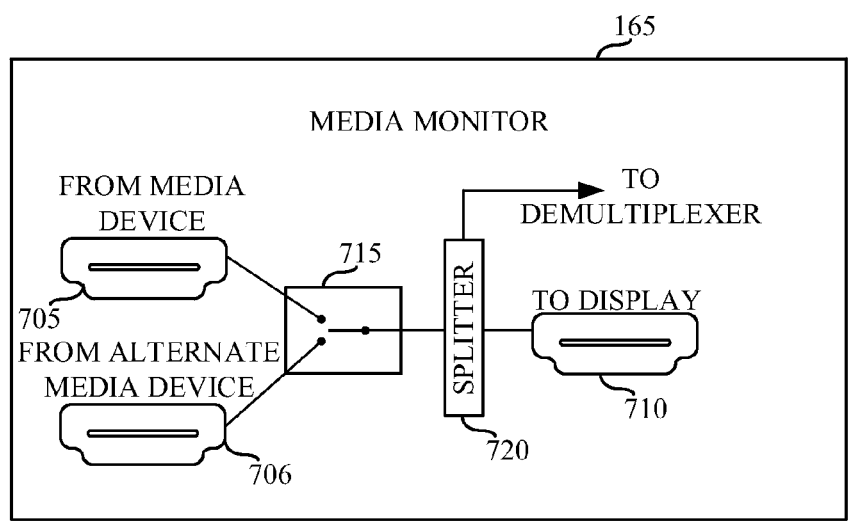
FIG. 7 is a block diagram of an example implementation of the example media monitor of FIGS. 1 and/or 2 including multiple media interceptors internal to the media monitor and a single output port.

FIG. 7 is a block diagram of an example implementation of the media monitor of FIGS. 1 and/or 2 including a media interceptor 167 internal to the media monitor 165 including multiple input ports. In the illustrated example of FIG. 7, the media monitor 165 includes a selector switch 715. The selector switch 715 enables selection of which media device (e.g., the media device 160 or the alternate media device 161) is electrically coupled to the display 162. The media monitor 165 of the illustrated example of FIG. 7 includes a splitter 720. The example media interceptor 167 receives HDMI data from the media device 160 via a first port 705. The example media interceptor 167 receives HDMI data from the alternate media device 161 via a second port 706. The example media interceptor 167 transmits HDMI data to the display 162 via the third port 710. Based on a position of the selector switch 715, either the HDMI data received via the first port 705 (e.g., HDMI data received from the media device 160) or the HDMI data received via the second port 706 (e.g., HDMI data received from the alternate media device 161) is transmitted to the splitter 720. The splitter transmits the HDMI data to the display 162 via the third port 710, and to the demultiplexer 220. In the illustrated example of FIG. 7, the media monitor 165 monitors the position of the selector switch to identify which media device is electrically coupled to the display 162. Such identification may later be used in calculating audience measurement information.

Figure 8:
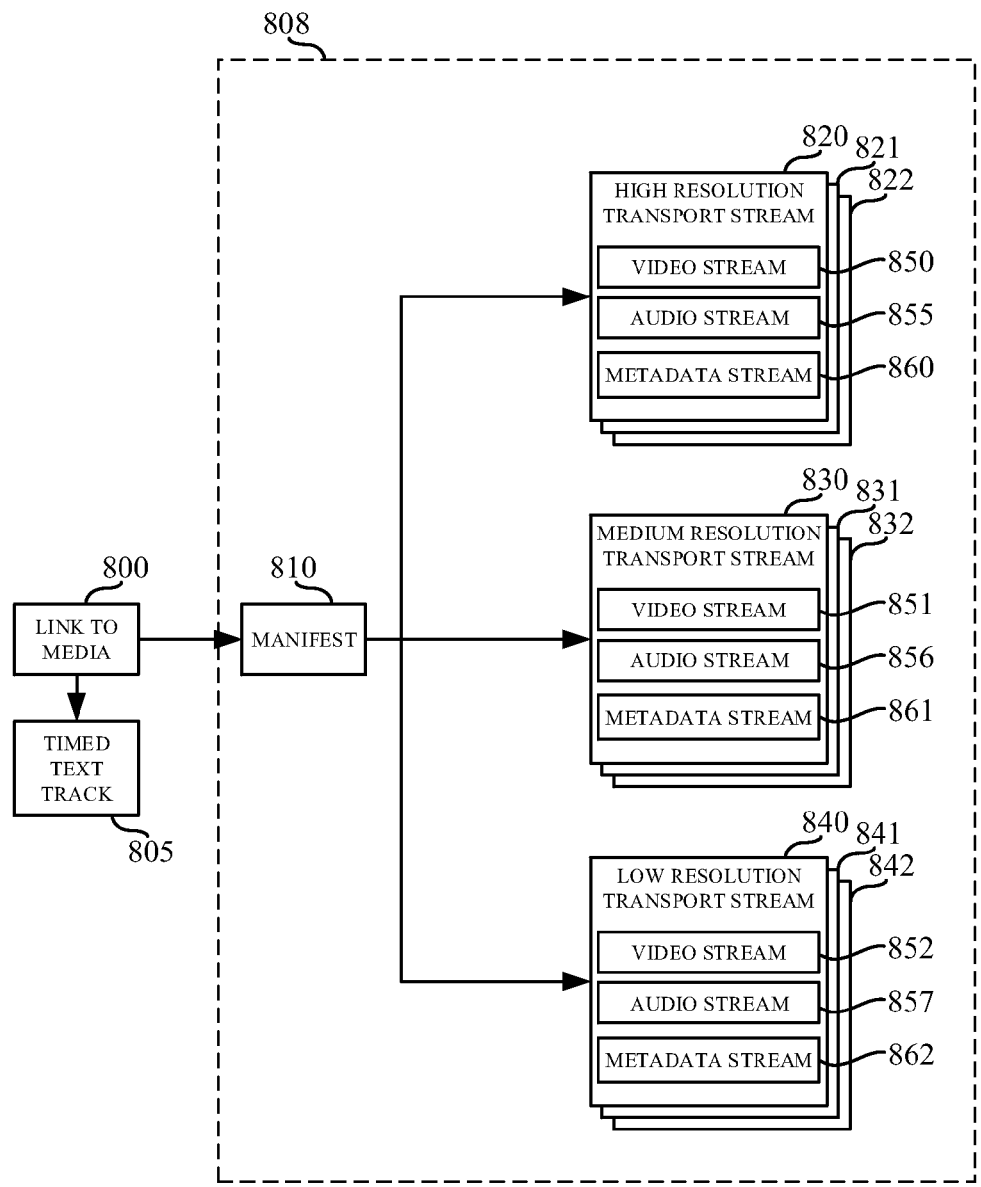
FIG. 8 is a block diagram of an example implementation of an example HLS stream that may be delivered to the example media device of FIGS. 1 and/or 2.

FIG. 8 is a block diagram of an example implementation of an example HLS stream 800 that may be delivered to the example media device 160 of FIGS. 1 and/or 2. In the illustrated example of FIG. 8, the HLS stream 800 includes a manifest 810 and three transport streams. However, any other number and/or type of transport streams may additionally or alternatively be used. In the illustrated example, a link 800 includes an instruction to load the manifest 810. In the illustrated example, the example link 800 includes an instruction to load a timed text track 805 associated with the media to be presented. In the illustrated example, the manifest 810 is an .m3u8 file that describes the available transport streams to the media device. However, any other past, present, and/or future file format and/or protocol may additionally or alternatively be used. In some examples, the manifest 810 is omitted and the media device 160 directly accesses a transport stream. In the illustrated example, the media device retrieves the manifest 810 in response to an instruction to display an HLS element (e.g., a video element).

HLS is an adaptive format, in that, although multiple devices retrieve the same manifest 810, different transport streams may be displayed depending on one or more factors. For example, devices having different bandwidth availabilities (e.g., a high speed Internet connection, a low speed Internet connection, etc.) and/or different display abilities select an appropriate transport stream for their display and/or bandwidth abilities. In some examples, a media device connecting to the internet via a slow Internet connection may use a lower resolution transport stream compared to a media device connecting to the Internet via a fast Internet connection.

In the illustrated example of FIG. 8, a high resolution transport stream 820, a medium resolution transport stream 830, and a low resolution transport stream 840 are shown. In the illustrated example, each transport stream 820, 830, and/or 840 represents a portion of the associated media (e.g., five seconds, ten seconds, thirty seconds, one minute, etc.). Accordingly, the high resolution transport stream 820 corresponds to a first portion of the media, a second high resolution transport stream 821 corresponds to a second portion of the media, a third high resolution transport stream 822 corresponds to a third portion of the media. Likewise, the medium resolution transport stream 830 corresponds to the first portion of the media, a second medium resolution transport stream 831 corresponds to the second portion of the media, and a third medium resolution transport stream 832 corresponds to the third portion of the media. In addition, the low resolution transport stream 840 corresponds to the first portion of the media, a second low resolution transport stream 841 corresponds to the second portion of the media, and a third low resolution transport stream 842 corresponds to the third portion of the media. Although three transport streams are shown in the illustrated example of FIG. 8 for each resolution, any number of transport streams representing any number of corresponding portions of the media may additionally or alternatively be used.

In the illustrated example, each transport stream 820, 821, 822, 830, 831, 832, 840, 841, and/or 842 includes a video stream 850, 851, 852, an audio stream 855, 856, 852, and a metadata stream 860, 861, 862. The video stream 850, 851, and/or 852 includes video associated with the media at different resolutions according to the resolution of the transport stream with which the video stream is associated. The audio stream 855, 856, and/or 857 includes audio associated with the media. The metadata stream 860, 861, and/or 862 includes metadata such as, for example, timed text track data, a link to the timed text track data, closed captioning data, and/or an ID3 tag associated with the media. In some examples, the metadata stream 860, 861, and/or 862 is not included as the information used to measure exposure to streaming media may already be transmitted to the media monitor 165 as the timed text track. In some examples, the metadata stream 860, 861, and/or 862 includes information that is not contained in the timed text track (e.g., additional closed captioning information, etc.)

Figure 9:
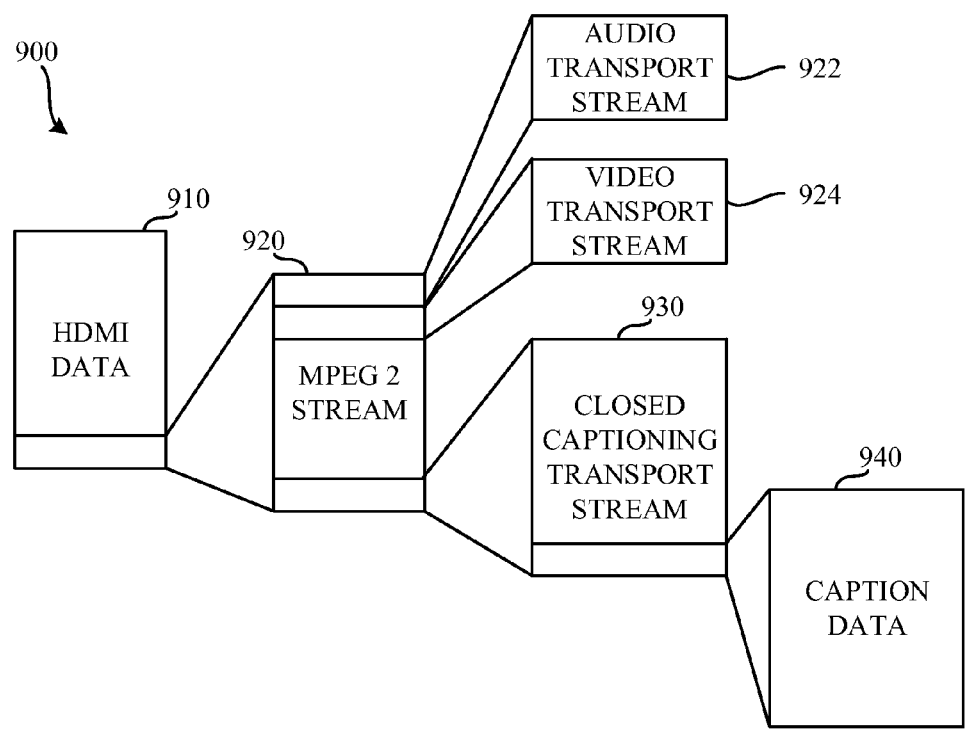
FIG. 9 is a block diagram of example HDMI data transmitted from the media device to the display of FIGS. 1 and/or 2.

FIG. 9 is a block diagram 900 of example HDMI data transmitted from the media device 160 to the display 162 of FIGS. 1 and/or 2. The HDMI data 910 represents raw data being transmitted via an HDMI interface (e.g., an HDMI cable, a Displayport cable, etc.). The HDMI data contains an MPEG2 stream 920. In some examples, the HDMI data includes remote control data (e.g., Consumer Electronics Control (CEC) data that enables multiple devices to be controlled using a single remote control), Ethernet data, audio data (e.g., return path audio data), etc. While in the illustrated example, an MPEG2 stream is shown, any other type and/or format of media stream may additionally or alternatively be used. The MPEG2 stream 920 includes multiple transport streams such as, for example, a video transport stream 924, an audio transport stream 922, and an example closed captioning transport stream 930. The closed captioning transport stream 930 of the illustrated example is a Digital Television closed captioning stream (DTVcc). However, any other type and/or format of closed captioning stream may additionally or alternatively be used. The example closed captioning transport stream 930 includes one or more sets of caption data 940. The caption data 940 of the illustrated example includes media-identifying metadata. The caption data 940 can be thought of as a metadata stream and may substantially correspond to the example metadata streams 860, 861, and/or 862 of FIG. 8. In some examples, the caption data 940 is modified by the media device 160 to include metadata included in a timed text track.

FIG. 10 illustrates example timed text track code 1000 representing an example timed text track that may be used by the example media device 160 of FIGS. 1 and/or 2. In the illustrated example, the timed text code 1000 is in a WebVTT format, as indicated by a format identifier 1015. However, the timed text track code 1000 may be in any other past, present, and/or future format such as, for example, a Timed Text Markup Language (TTML) format, etc. In the illustrated example, the WebVTT elements are arranged such a time 1001 at which timed text track events are triggered progresses from the top of FIG. 10 to the bottom of FIG. 10. The timed text track code 1000 of FIG. 10 includes a first timed event 1010. The first timed event 1010 includes a start time 1011 and an end time 1012. The first timed event 1010 includes metadata 1020 formatted in an ID3 format. However, any other format and/or type of metadata may additionally or alternatively be used. In particular, the metadata 1020 includes a contentid section that includes identifying information 1025. In the illustrated example, the identifying information 1025 identifies the media being presented via the associated media stream.

FIG. 10 illustrates a progression through time of the associated media. For example, FIG. 10 shows time A 1050, time B 1060, time C 1070, and time D 1080. In the illustrated example, during a first time period after the time A 1050 and before the time B 1060, a first segment of a television show is presented. During a second time period after the time B 1060 and before the time C 1070, an advertisement is presented. During a third time period after the time C 1070 and before the time D 1080, a second segment of the television show is presented.

The timed text track code 1000 describes cue change events that are to be triggered in association with the presentation of the media. In the illustrated example, the first time segment is identified by the first timed event 1010. The identifying information 1025 of the metadata 1020 of the first timed event 1010 identifies the first segment of the television show. In the illustrated example, the first timed event 1010 is triggered after one second of media has been presented. The first timed event 1010 is triggered after one second of media has been presented because, in some examples the event listener function 320 may not have loaded within the first second of media playback. In some examples, alternative start times are used such as, for example, zero seconds (e.g., no delay), five seconds, ten seconds, one minute, etc.

In the illustrated example, the second time period is identified by a second timed event 1040. The second timed event 1040 begins one second after the completion of the first time segment. However, any other time delay may additionally or alternatively be used. The second timed event 1040 includes metadata identifying the advertisement displayed during the second time segment.

In the illustrated example, the third time period is identified by a third timed event 1045. The third timed event 1045 begins one second after the completion of the second timed event 1040. However, any other time delay may additionally or alternatively be used. The third timed event 1045 includes metadata identifying the second segment of the television show. In the illustrated example, the metadata identifying the second segment of the television show is different from the metadata identifying the first segment of the television show. However, in some examples, the metadata identifying the second segment of the television show is the same as the metadata identifying the first segment of the television show.

In the illustrated example, a cue change event is triggered at the start of each of the timed events (e.g., the first timed event 1010, the second timed event 1040, the third timed event 1045, etc.). Thus, the timed events 1010, 1040, 1045 occur when the media is within a different time segment defined by the timed text track than was previously presented (including the start of media presentation). In the illustrated example, the timed text track time segments and corresponding timed events are divided into segments corresponding to the media presented (e.g., the first timed event is associated with the first segment of the television show, the second timed event 1040 is associated with the advertisement, etc.).

In some examples, the timed text track events are divided into fixed length segments (e.g., five seconds, ten seconds, one minute, etc.) and are associated with the media presented within the respective fixed length segments. Segmenting the timed text track into segments facilitates accurate collection of media monitoring data, as more data points representing various times within the media presentation are collected. When used with timestamps, using small segments (e.g., thirty seconds, one minute, etc.) facilitates detection of other media interaction events such as, for example, skip, stop, pause, play, events because expected time durations between timed text track cue changes can be compared to actual time durations between timed text track cue changes. In some examples, the timed text track is not divided into separate segments and includes a single segment spanning the entire presentation of the media.

While an example manner of implementing the service provider 120, the media device 160, and/or media monitor 165 has been illustrated in FIGS. 1, 2, and/or 3, one or more of the elements, processes and/or devices illustrated in FIGS. 1, 2, and/or 3 may be combined, divided, re-arranged, omitted, eliminated and/or implemented in any other way. Further, the example media identifier 125, the example transcoder 130, the example metadata embedder 135, the example media transmitter 140, and/or more generally, the example service provider 120 of FIGS. 1 and/or 2, the example media device 160 of FIGS. 1 and/or 2, the example media interceptor 167, the example media interceptor 268, the example demultiplexer 220, the example metadata extractor 230, the example metadata converter 240, the example transmitter 250, the example splitter 410, 515, 720, the example switch 715, and/or more generally, the example media monitor 165 of FIGS. 1, 2, and/or 3 may be implemented by hardware, software, firmware and/or any combination of hardware, software and/or firmware. Thus, for example, any of the example media identifier 125, the example transcoder 130, the example metadata embedder 135, the example media transmitter 140, and/or more generally, the example service provider 120 of FIGS. 1 and/or 2, the example media device 160 of FIGS. 1 and/or 2, the example media interceptor 167, the example media interceptor 268, the example demultiplexer 220, the example metadata extractor 230, the example metadata converter 240, the example transmitter 250, the example splitter 410, 515, 720, the example switch 715, and/or more generally, the example media monitor 165 of FIGS. 1, 2, and/or 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example media identifier 125, the example transcoder 130, the example metadata embedder 135, the example media transmitter 140, the example media device 160, the example media interceptor 167, the example media interceptor 268, the example demultiplexer 220, the example metadata extractor 230, the example metadata converter 240, the example transmitter 250, the example splitter 410, 515, 720, and/or the example switch 715 are hereby expressly defined to include a tangible computer readable storage device or storage disc such as a memory, DVD, CD, Blu-ray, etc. storing the software and/or firmware. Further still, the example service provider 120 of FIGS. 1 and/or 2, the example media device 160 of FIGS. 1 and/or 2, and/or the example media monitor 156 of FIGS. 1, 2, and/or 3 may include one or more elements, processes and/or devices in addition to, or instead of, those illustrated in FIGS. 1, 2, and/or 3, and/or may include more than one of any or all of the illustrated elements, processes and devices.

Figure 11:
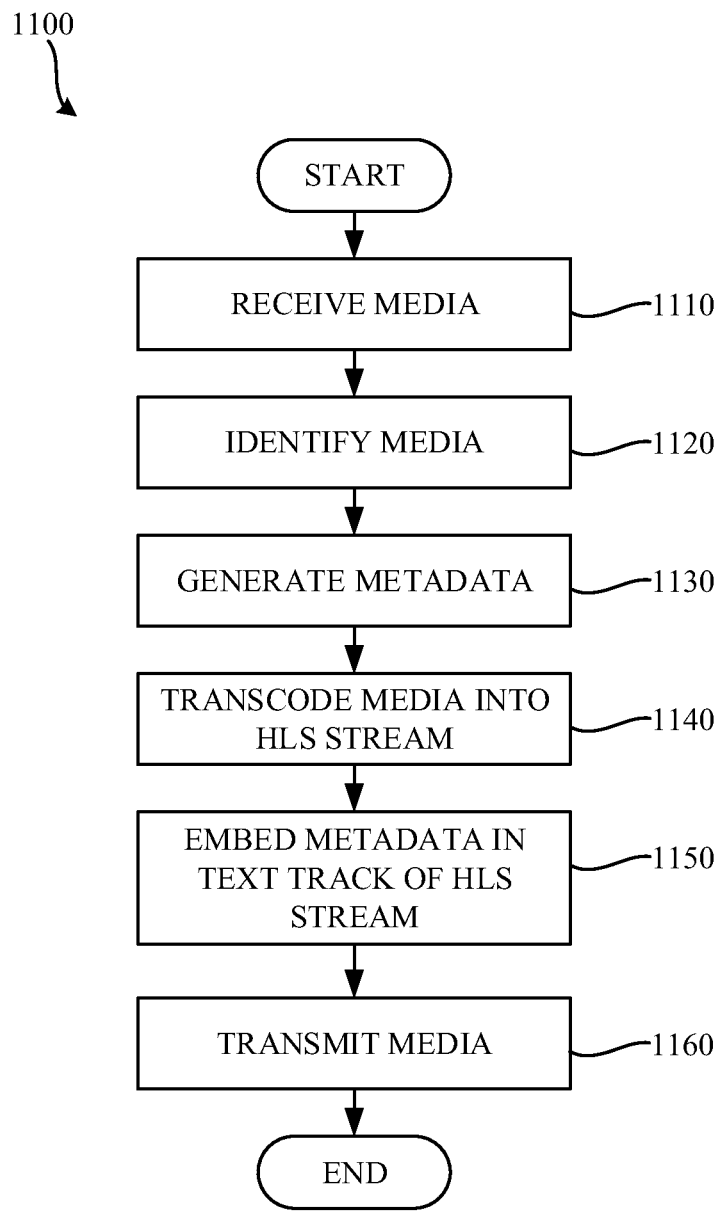
FIG. 11 is a flowchart representative of example machine-readable instructions which may be executed to implement the example service provider of FIGS. 1 and/or 2.
Figure 12:
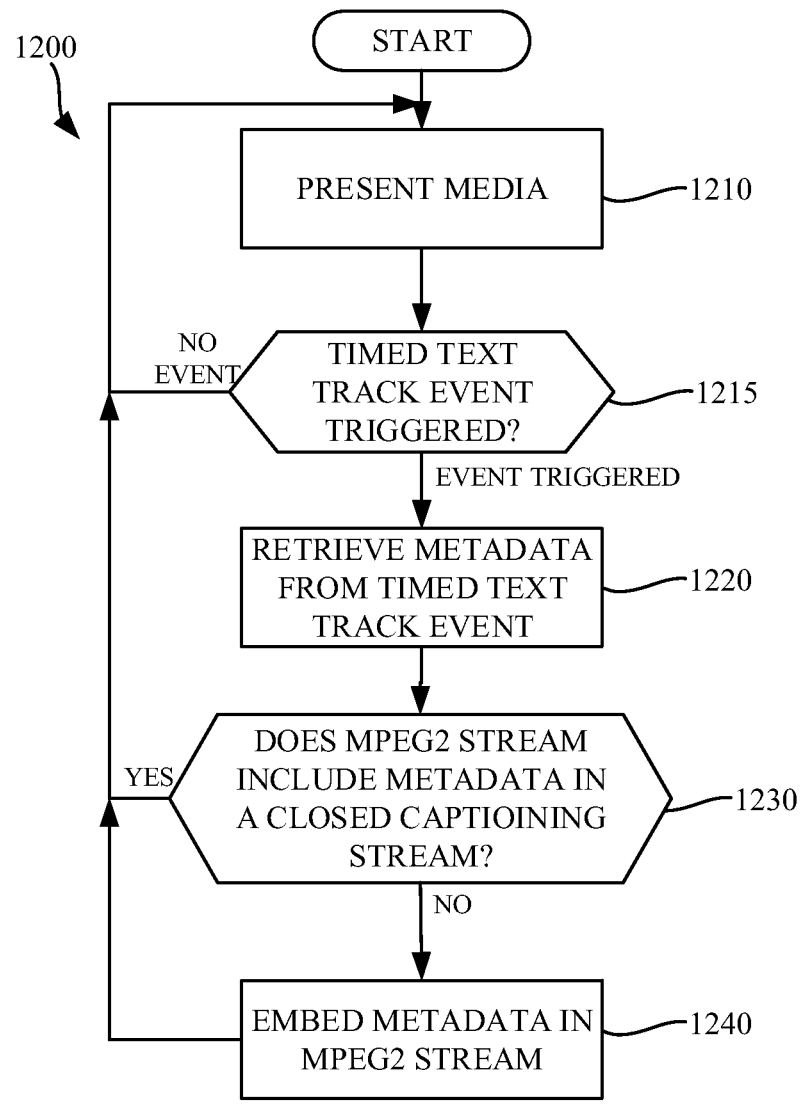
FIG. 12 is a flowchart representative of example machine-readable instructions which may be executed to implement the example media device of FIGS. 1 and/or 2.
Figure 13:
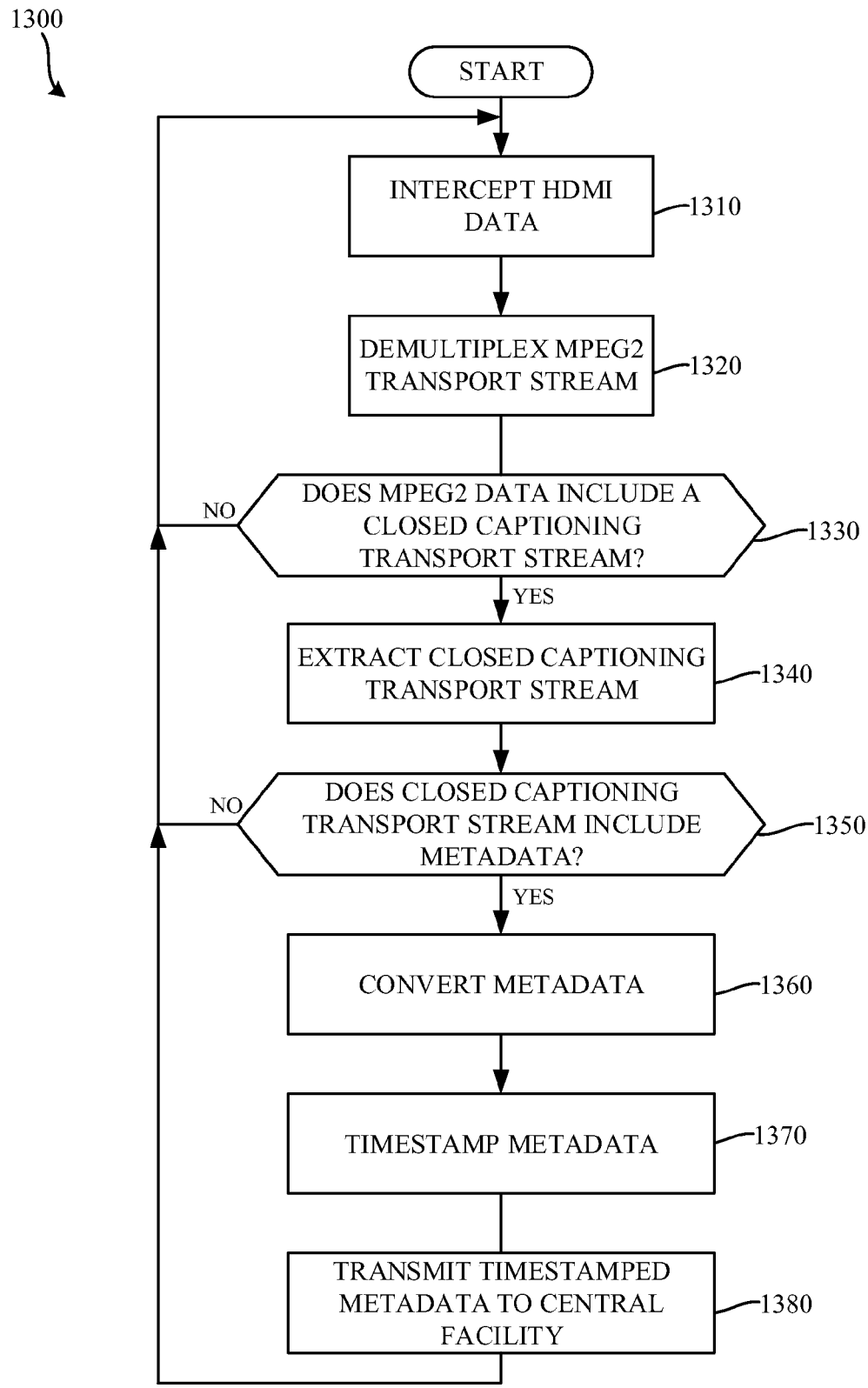
FIG. 13 is a flowchart representative of example machine-readable instructions which may be executed to implement the example media monitor of FIGS. 1 and/or 2.
Figure 14:
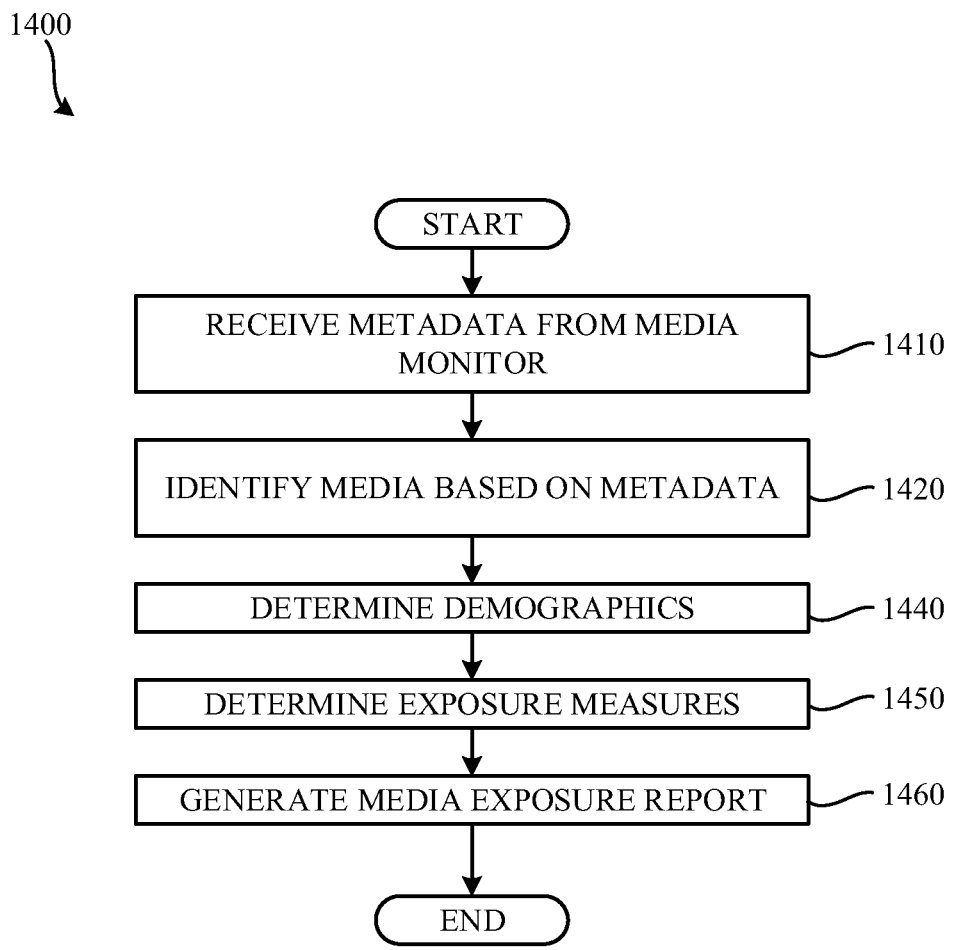
FIG. 14 is a flowchart representative of example machine-readable instructions which may be executed to implement the example central facility of FIGS. 1 and/or 2.
Figure 15:
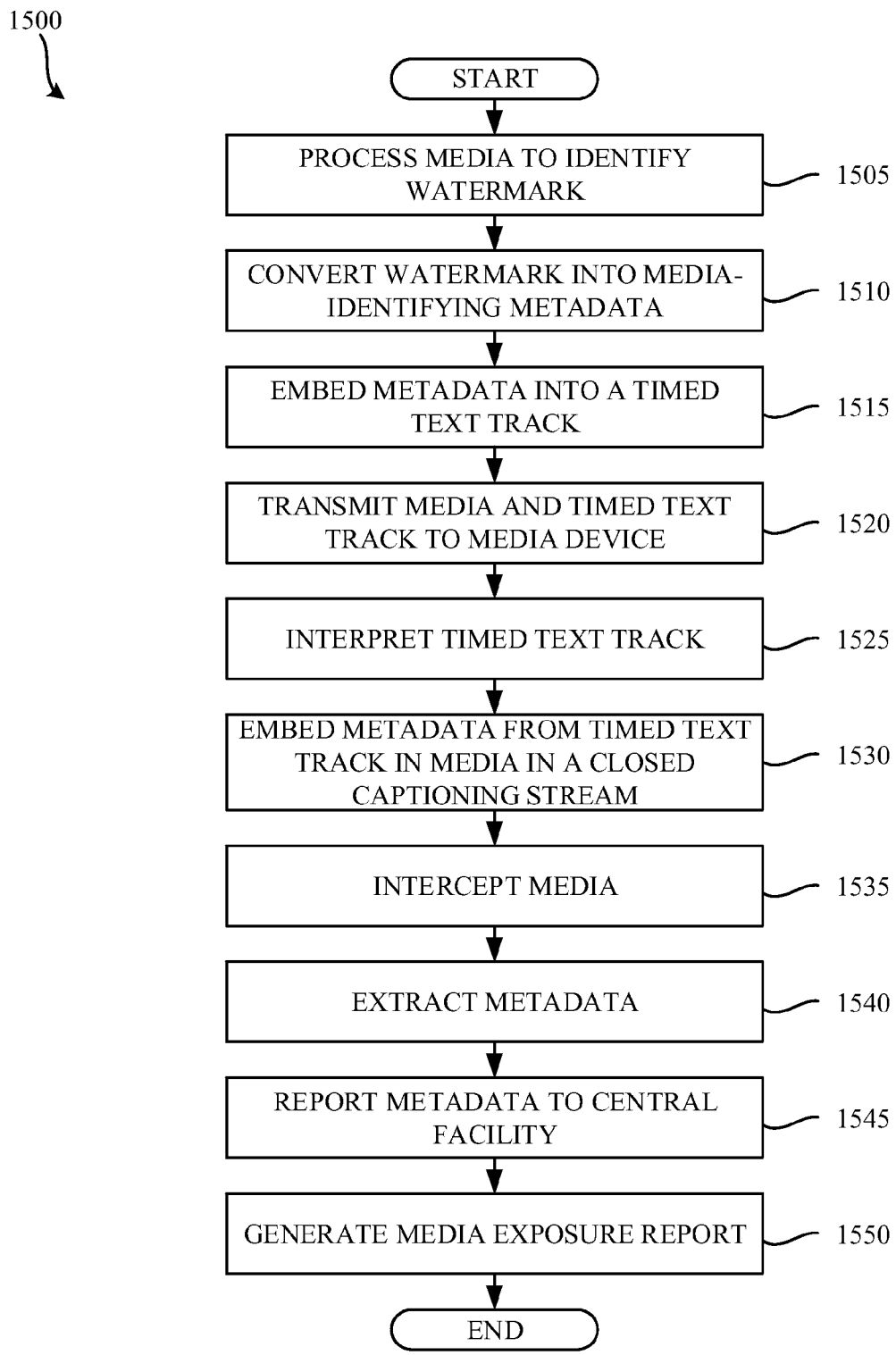
FIG. 15 is a flowchart representative of example machine-readable instructions which may be executed to implement the example service provider of FIGS. 1 and/or 2, the example media device of FIGS. 1 and/or 2, the example media monitor of FIGS. 1 and/or 2, and/or the example central facility of FIGS. 1 and/or 2.

A flowchart representative of example machine readable instructions for implementing the service provider 110 of FIGS. 1 and/or 2 is shown in FIG. 11. A flowchart representative of example machine readable instructions for implementing the media device 160 of FIGS. 1 and/or 2 is shown in FIG. 12. A flowchart representative of example machine readable instructions for implementing the media monitor 165 of FIGS. 1, 2, and/or 3 is shown in FIG. 13. A flowchart representative of example machine-readable instructions for implementing the example central facility 170 of FIGS. 1 and/or 2 is shown in FIG. 14. A flowchart representative of example machine-readable instructions for implementing the example service provider 110 of FIGS. 1 and/or 2, the example media device 160 of FIGS. 1 and/or 2, the example media monitor 165 of FIGS. 1 and/or 2, and/or the example central facility 170 of FIGS. 1 and/or 2 is shown in FIG. 15. In these examples, the machine readable instructions comprise a program for execution by a processor such as the processor 1612 shown in the example processor platform 1600 discussed below in connection with FIG. 16. The program may be embodied in software stored on a tangible computer readable storage medium such as a CD-ROM, a floppy disk, a hard drive, a digital versatile disk (DVD), a Blu-ray disk, or a memory associated with the processor 1612, but the entire program and/or parts thereof could alternatively be executed by a device other than the processor 1612 and/or embodied in firmware or dedicated hardware. Further, although example programs are described with reference to the flowcharts illustrated in FIGS. 11, 12, 13, 14, and/or 15, many other methods of implementing the example service provider 110, the example media device, and/or the example media monitor 165 may alternatively be used. For example, the order of execution of the blocks may be changed, and/or some of the blocks described may be changed, eliminated, or combined.

As mentioned above, the example processes of FIGS. 11, 12, 13, 14, and/or 15 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein "tangible computer readable storage medium" and "tangible machine readable storage medium" are used interchangeably. Additionally or alternatively, the example processes of FIGS. 11, 12, 13, 14, and/or 15 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

FIG. 11 is a flowchart representative of example machine-readable instructions 1100 which may be executed to implement the example service provider 120 of FIG. 1. Execution of the example machine-readable instructions 1100 of FIG. 11 begins with the media identifier 125 of the service provider 120 receiving the media from the media provider 110 (block 1110). In the illustrated example, the media is received as it is broadcast. However, in some examples, the media is stored and/or cached by the media identifier 125.

The media identifier 125 of the illustrated example then identifies the media (block 1120). The media identifier 125 identifies the media by extracting metering data (e.g., signatures, watermarks, codes, etc.) from the media. Based on the extracted metering data, the media identifier 125 generates metadata (block 1130). In the illustrated example, the metadata is generated in an ID3 format. However, any other metadata format may additionally or alternatively be used. Further, in the illustrated example, the metadata is generated based on the extracted metering data. However, in some examples, the metadata may be generated by querying an external source using some or all of the extracted metering data.

The media is then transcoded by the transcoder 130 of the service provider 120 (block 1140). In the illustrated example, the media is transcoded into an MPEG2 transport stream that may be transmitted via HTTP live streaming (HLS). In particular, the metadata embedder 135 of the service provider 120 embeds the metadata into a timed text track associated with the HLS stream (block 1150). In the illustrated example, the metadata is embedded in a timed text track document that is external to the HLS stream. However, in some examples, the metadata is embedded into the media itself as, for example, closed captioning data. For example, the timed text track information may be encoded in an MPEG2 transport stream as closed captioning. In the illustrated example, the metadata embedded into the timed text track identifies different media being presented at different times.

The media is then transmitted by the media transmitter 140 of the service provider 120 (block 1160). In the illustrated example, the media is transmitted using HTTP live streaming (HLS). However, any other format and/or protocol for transmitting (e.g., broadcasting, unicasting, multicasting, streaming, etc.) media may additionally or alternatively be used.

FIG. 12 is a flowchart representative of example machine-readable instructions 1200 which may be executed to implement the example media device 160 of FIGS. 1 and/or 2. In the illustrated example of FIG. 12, execution of the example machine-readable instructions 1200 of FIG. 12 begins when the media device 160 presents media (block 1210). Media is presented by, for example, transmitting the media via an output such as, for example, an HDMI interface. When presenting the media, the media device 160 transmits an MPEG2 stream including a closed captioning transport stream such as the example closed captioning transport stream 930 of FIG. 9 to the display 162.

The media device 160 determines if a timed text track event is to be triggered (block 1215). If the timed text track is not to be triggered (block 1215), the media device 160 continues to present the media (block 1210). If the timed text track event is to be triggered (block 1215), the media device 160 retrieves metadata associated with the timed text track event (block 1220).

In some examples, the closed captioning transport stream including the metadata is already included in the MPEG2 transport stream received from the service provider 120. That is, the metadata included in the timed text track may previously been integrated into the closed captioning transport stream. The media device determines if the metadata is already present in the closed captioning stream (block 1230). If the closed captioning transport stream includes the metadata (block 1230), the media device continues to present the media (block 1210). If the metadata is not included in the closed captioning transport stream, the example media device 160 embeds the metadata in the MPEG2 transport stream as closed captioning data (block 1240). The media device 160 then continues to present the media, including the embedded metadata in the closed captioning transport stream (block 1210).

FIG. 13 is a flowchart representative of example machine-readable instructions 1300 which may be executed to implement the example media monitor 160 of FIGS. 1 and/or 2. In the illustrated example of FIG. 13, execution of the example machine-readable instructions 1300 of FIG. 13 begins when the media interceptor 167, 168 intercepts a HDMI data via an input port such as the input port 205 (block 1310). The demultiplexer 220 demultiplexes the HDMI data to extract an MPEG2 transport stream, and various transport streams within the MPEG2 transport stream (block 1320). Demultiplexing enables individual transport streams within the MPEG2 stream to be analyzed. The metadata extractor 230 determines whether the demultiplexed MPEG2 transport stream includes a closed captioning transport stream (block 1330). If the MPEG2 transport stream does not include the closed captioning transport stream, the media interceptor 167 continues to intercept HDMI data (block 1310). If the MPEG2 transport stream includes the closed captioning transport stream, the metadata extractor 230 extracts the closed captioning stream (block 1340). The metadata extractor 230 inspects the closed captioning stream to determine whether it includes a metadata stream (block 1350). In some examples, the closed captioning stream includes closed captioning data (e.g., English subtitles, Spanish subtitles, etc.) that may not assist in identifying the media. In the illustrated example, the metadata extractor ignores closed captioning data that is not media identifying metadata. However, because of the metadata encoding process described in FIGS. 11 and/or 12, some closed captioning transport streams include media-identifying metadata. If no media-identifying metadata is found, the media interceptor 167 continues to intercept HDMI data (block 1310).

If media-identifying metadata is found, the metadata converter 240 of the media monitor 165 converts the metadata (block 1360) into a format for use by the transmitter 250 of the media monitor 165. In the illustrated example, the metadata is converted from a binary data format into a text format. In some examples, the metadata is parsed to identify portions (e.g., fields, sections, etc.) of interest of the metadata (e.g., a genre, an artist, a song title, an album name, a transmitting station/server site, etc.). In some examples, the metadata converter 240 embeds an identifier of the media monitor 165, an identifier of the media device 160, and/or an identifier of a user of the media device (e.g., a panelist identifier) in the metadata. Including the identifier(s) of the presentation device and/or the user of the presentation device enables the central facility 170 to correlate the media that was presented with the presentation device and/or the user(s) of the presentation device. In the illustrated example, the metadata converter 240 adds a timestamp to the metadata prior to transmitting the metadata to the central facility 170. Timestamping (e.g., recording a time that an event occurred) enables accurate identification and/or correlation of media that was presented and/or the time that it was presented with the user(s) of the presentation device.

In some examples, the metadata may not undergo conversion before transmission by the transmitter (e.g., the metadata may be sent in the format in which it is extracted by the metadata extractor 230). In such examples, the central facility 170 converts the metadata into a format for use by the central facility 170 by, for example, converting the metadata to a different format, parsing the metadata to identify portions of interest of the metadata, etc. Conversion of the metadata by the central facility 170 facilitates correlation of the media that was presented with an identifier identifying to whom the media was presented. In some examples, the central facility 170 timestamps the metadata upon receipt. Timestamping the metadata enables accurate identification and/or correlation of media that was presented and/or the time that it was presented with the user(s) of the presentation device.

The transmitter 250 then transmits the metadata to the central facility 170 (block 1380). In the illustrated example, the metadata is transmitted using an HTTP Post request. However, any other method of transmitting data and/or metadata may additionally or alternatively be used. For example, a file transfer protocol (FTP), an HTTP Get request, Asynchronous JavaScript and extensible markup language (XML) (AJAX), etc., may be used to transmit the metadata. In some examples, the data and/or metadata may be stored in a memory of the media monitor 160 (e.g., a memory card, a flash drive, etc.) which may be removed and physically sent (e.g., mailed, etc.) to the central facility 170. In the illustrated example, the metadata is transmitted in real-time (e.g., streamed) to the central facility 170. However, in some examples, the metadata may be stored (e.g., cached, buffered, etc.) for a period of time before being transmitted to the central facility 170.

FIG. 14 is a flowchart representative of example machine-readable instructions 1400 which may be executed to implement the example central facility 170 of FIGS. 1 and/or 2. Initially, the central facility 170 receives metadata from one or more media monitors 165 (block 1410). For example, a media monitor 165 may be used in association with a panelist home. Additionally or alternatively, multiple media monitors 165 may be present in a single panelist home. When receiving metadata from the media monitor 165, the central facility 170 records which media monitor 165 the metadata was received from. Such media monitor identifying information may be later used to, for example, identify the panelists associated with the media monitor 165.

The central facility 170 identifies media based on the received metadata (block 1420). In the illustrated example, the metadata represents media exposure information indicative of which users (e.g., panelists) are associated with the media monitor 165. In the illustrated example, the central facility 170 determines demographics of the panelist(s) (block 1440) associated with the media monitor 165 transmitting the metadata. For example, the central facility 170 may look up demographic information based on the geographic location(s) of the identified panelist(s), may look up demographic information provided by the panelist(s), etc.

The example central facility 170 determines media exposure measures (block 1450) based on the metadata received at block 1410. In some examples, the central facility 170 determines media exposure metrics based on different demographics associated with the collected media metadata and/or different device types associated with the collected media metadata. In some examples, a people meter collects data identifying people present in the audience of a metered information presentation device such as, for example, the display 162, the media device 160, etc. The people identifying information is used to look up demographics collected from panelists during a registration process. This information is used to statistically project the demographic composition of the audience as a whole. The example central facility 170 generates a media exposure report summarizing the media exposure metrics (block 1460).

FIG. 15 is a flowchart representative of example machine-readable instructions which may be executed to implement the example service provider 120 of FIGS. 1 and/or 2, the example media device 160 of FIGS. 1 and/or 2, the example media monitor 165 of FIGS. 1 and/or 2, and/or the example central facility 170 of FIGS. 1 and/or 2 to measure exposure to streaming media. The example process of FIG. 15 begins when the service provider 120 processes media to be transmitted to the media device 160 to identify a watermark (block 1505). In the illustrated example of FIG. 15, a watermark (e.g., a watermark used by, for example, the Nielsen Company (US) LLC that was previously embedded into the media is used. However, any other way of identifying media may additionally or alternatively be used such as, for example, codes, signatures, fingerprints, etc. The example service provider 120 of FIG. 1 converts the identified watermark into media identifying metadata (block 1510). The media identifying metadata is embedded into a timed text track (block 1515) by the service provider 120. While the illustrated example of FIG. 1 discloses an example implementation of the service provider 120, other example implementations of the service provider 120 may additionally or alternatively be used, such as the example implementations disclosed in U.S. patent application Ser. No. 13/445,961, which is hereby incorporated by reference herein in its entirety.

The timed text track (including the media-identifying metadata) and the media are transmitted to the media device (block 1520). In the illustrated example, the timed text track and the media are transmitted as separate items (i.e., they are transmitted in response to separate requests). However in some examples, the timed text track and the media may be transmitted together.

The media device 160 of FIGS. 1 and/or 2 interprets the timed text track (block 1525). As described in connection with FIG. 10, the timed text track is interpreted to identify when particular closed captioning data (e.g., metadata) should be included in the media. Timed text track events are trigged when the media device 160 reaches a particular time within the playback of the media. Events within the timed text track, when triggered, cause the media device 160 to embed the closed captioning data associated with the respective timed text track event into the media (block 1530). The embedded metadata is transmitted as part of the media (e.g., in a closed captioning transport stream of the MPEG2 stream) to the display 162.

The media monitor 165 intercepts the media intermediate the media device 160 and the display 162 via a media interceptor 167 (block 1535). That is, the media is split to two or more devices after being output from the media device 160, namely the display 162 and the media monitor 165. The media monitor 165 extracts metadata (e.g., the media-identifying metadata generated in block 1510) from the media by inspecting the closed captioning transport stream (block 1540). The extracted metadata is reported by the media monitor 165 to the central facility 170 (block 1545). With the metadata received at the central facility 170, central facility 170 generates a media exposure report summarizing the media exposure metrics (block 1550). In the illustrated example, the media exposure report identifies viewing preferences of viewers having different demographic details. However, the media exposure report may identify any other metrics and/or statistics associated with media exposure.

Figure 16:
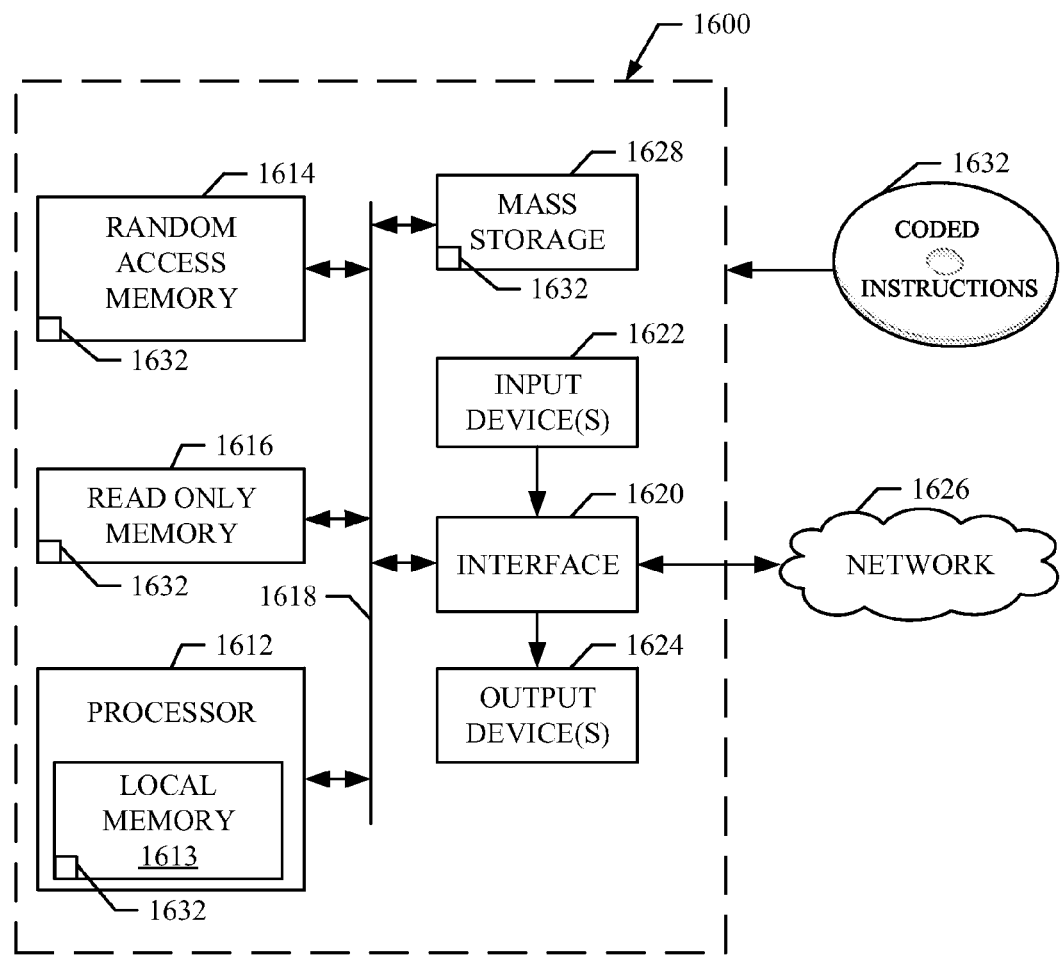
FIG. 16 is a block diagram of an example processor platform capable of executing the example machine-readable instructions of FIGS. 11, 12, 13, 14, and/or 15 to implement the example service provider of FIGS. 1 and/or 2, the example media device of FIGS. 1 and/or 2, the example media monitor of FIGS. 1 and/or 2, and/or the example central facility of FIGS. 1 and/or 2.

FIG. 16 is a block diagram of an example processor platform 1600 capable of executing the instructions of FIGS. 11, 12, 13, 14, and/or 15 to implement the example service provider 120, the example media device 160, the example central facility 170, and/or the example media monitor 165 of FIGS. 1, 2, and/or 3. The processor platform 1600 can be, for example, a server, a personal computer, a media device (e.g., an Apple TV®, a Roku™ media player, a Boxee™ media player, a Sony PlayStation™, a Microsoft® Xbox®, a smart TV, etc.), an Internet appliance, a DVD player, a CD player, a digital video recorder, a Blu-ray player, a gaming console, a personal video recorder, a set top box, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit a user to enter data and commands into the processor 1612. The input device(s) can be implemented by, for example, an audio sensor, a microphone, a camera (still or video), a keyboard, a button, a mouse, a touchscreen, a track-pad, a trackball, a remote control, and/or a voice recognition system.

One or more output devices 1624 are also connected to the interface circuit 1620 of the illustrated example. The output devices 1624 can be implemented, for example, by display devices (e.g., a liquid crystal display, a cathode ray tube display (CRT), a touchscreen, a tactile output device, a light emitting diode (LED), and/or speakers). The interface circuit 1620 of the illustrated example, thus, typically includes a graphics driver card.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.).

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, RAID systems, and digital versatile disk (DVD) drives.

The coded instructions 1632 of FIGS. 11, 12, 13, 14, and/or 15 may be stored in the mass storage device 1628, in the volatile memory 1614, in the non-volatile memory 1616, and/or on a removable tangible computer readable storage medium such as a CD or DVD.

Although certain example methods, apparatus, and articles of manufacture have been described herein, the scope of coverage of this patent is not limited thereto. On the contrary, this patent covers all methods, apparatus, and articles of manufacture fairly falling within the scope of the claims of this patent.

What is claimed is:

1. A method comprising:
  intercepting, with a media monitor intermediate a media device and a display, a second transport stream including media output from the media device, the media monitor coupling the media device to the display, the second transport stream including a textual representation of a watermark obtained by the media device from a timed text track associated with but separate from a first transport stream received by the media device;
  accessing, at the media monitor, the textual representation of the watermark from the intercepted second transport stream, the textual representation of the watermark inserted into the second transport stream by the media device based on the timed text track;

determine whether the textual representation of the watermark is (1) media identifying metadata and (2) formatted using an ID3 format; and in response to the determination that the textual representation of the watermark is (1) the media identifying metadata and (2) formatted using the ID3 format, forwarding, from the media monitor, the textual representation of the watermark to a central facility of an audience measurement entity.

2. The method as described in claim 1, further including associating the watermark with the media at the central facility.

3. The method as described in claim 2, further including transmitting audience identifying information to the central facility.

4. The method as described in claim 3, further including associating the audience identifying information with the media.

5. The method as described in claim 4, further including generating a media exposure report based on the audience identifying information and the media.

6. The method as described in claim 1, wherein the textual representation of the watermark is included in a closed captioning portion of the second transport stream.

7. The method as described in claim 1, wherein the streaming format is a Hypertext Transfer Protocol (HTTP) Live Streaming (HLS) protocol.

8. A system to measure exposure to streaming media, the system comprising:

a central facility of an audience measurement entity; and a media monitor to intercept second media intermediate a media device and a display, the media monitor to couple the media device to the display, the second media including a textual representation of a watermark obtained by the media device from a timed text track associated with but separate from first media received by the media device, the textual representation of the watermark inserted into the second transport stream by the media device based on the timed text track, the media monitor to access the textual representation of the watermark in a closed captioning portion of the second media, the media monitor to transmit the watermark to the central facility in response to determining the textual representation is (1) media identifying metadata and (2) formatted using an ID3 format.

9. The system as described in claim 8, wherein the media monitor is to collect audience identifying information associated with the display and transmit the audience identifying information to the central facility.

10. The system as described in claim 8, wherein the central facility is to generate a media exposure report based on the audience identifying information and the watermark.

11. A tangible machine-readable storage medium comprising machine-readable instructions which, when executed, cause a processor of a media monitor to at least:

intercept a second transport stream including media output from a media device, the intercepting performed intermediate the media device and a display device, the media monitor coupling the media device and the display, the second transport stream including a textual representation of a watermark obtained by the media device from a timed text track associated with but separate from a first transport stream received by the media device;

access the textual representation of the watermark from the intercepted second transport stream, the textual representation of the watermark inserted into the second transport stream by the media device based on the timed text track;

determine whether the textual representation of the watermark is (1) media identifying metadata and (2) formatted using the ID3 format; and in response to determining that the textual representation of the watermark is (1) the media identifying metadata and (2) formatted using the ID3 format, forward the textual representation of the watermark to a central facility of an audience measurement entity.

12. The machine-readable storage medium of claim 11, wherein the instructions, when executed, further cause the processor to transmit audience identifying information to the central facility.

13. The machine-readable storage medium of claim 12, wherein the instructions, when executed, further cause the processor to associate the audience identifying information with the media.

14. The machine-readable storage medium of claim 13, wherein the central facility is to generate a media exposure report based on the audience identifying information and the media.

15. The machine-readable storage medium of claim 11, wherein the textual representation of the watermark is included in a closed captioning portion of the second transport stream.

16. The machine-readable storage medium of claim 11, wherein the streaming format is a Hypertext Transfer Protocol (HTTP) Live Streaming (HLS) protocol.

17. The method as described in claim 1, wherein the audience measurement entity is not involved with delivery of the first transport stream to the media device.

18. The system as described in claim 8, wherein the audience measurement entity is not involved with delivery of the first media to the media device.

19. The machine-readable storage medium of claim 11, wherein the audience measurement entity is not involved with delivery of the first transport stream to the media device.

* * * * *